United States Patent
Janik et al.

(10) Patent No.: US 6,243,261 B1
(45) Date of Patent: Jun. 5, 2001

(54) THERMALLY EFFICIENT COMPUTER INCORPORATING DEPLOYING CPU MODULE

(75) Inventors: Craig M. Janik, Los Altos Hills; Dennis J. Boyle, Palo Alto; Ryan H. Mongan, Redwood City; Michael J. Shawver, Oakland, all of CA (US)

(73) Assignee: Speculative Incorporated, Palo Alto, CA (US)

( * ) Notice: Subject to any disclaimer, the term of this patent is extended or adjusted under 35 U.S.C. 154(b) by 0 days.

(21) Appl. No.: 09/020,148

(22) Filed: Feb. 6, 1998

Related U.S. Application Data

(63) Continuation-in-part of application No. 08/708,093, filed on Aug. 23, 1996, now Pat. No. 5,774,333.

(51) Int. Cl.[7] ............................... G06F 1/20; H05K 7/20
(52) U.S. Cl. ............................. 361/687; 361/681
(58) Field of Search ..................... 361/687, 690, 361/681, 686, 818; 364/708.1; 174/16.3, 15.2; 165/104.33; 454/184

(56) References Cited

U.S. PATENT DOCUMENTS

| | | |
|---|---|---|
| 3,828,215 | 8/1974 | Bilsback . |
| 4,084,213 | 4/1978 | Kirchner et al. . |
| 4,496,943 | 1/1985 | Greenblatt . |
| 4,571,456 | 2/1986 | Kishi et al. . |
| 4,617,640 | 10/1986 | Kishi et al. . |
| 4,742,478 | 5/1988 | Nigro, Jr. et al. . |
| 4,744,005 | 5/1988 | Milani . |
| 4,839,837 | 6/1989 | Chang . |
| 4,953,058 | 8/1990 | Harris . |
| 4,980,848 * | 12/1990 | Griffin et al. ........................ 361/687 |
| 4,997,032 | 3/1991 | Danielson et al. . |
| 5,086,509 | 2/1992 | Inubushi et al. . |
| 5,097,388 | 3/1992 | Buist et al. . |
| 5,103,376 | 4/1992 | Blonder . |
| 5,115,374 | 5/1992 | Hongoh . |
| 5,136,465 | 8/1992 | Benck et al. . |
| 5,157,585 | 10/1992 | Myers . |
| 5,229,757 | 7/1993 | Takamiya et al. . |
| 5,243,493 | 9/1993 | Jeng et al. . |
| 5,264,992 | 11/1993 | Hogdahl et al. . |
| 5,313,362 * | 5/1994 | Hatada et al. ........................ 361/709 |
| 5,381,043 | 1/1995 | Kohiyama . |
| 5,383,340 | 1/1995 | Larson et al. . |
| 5,424,913 | 6/1995 | Swindler et al. . |
| 5,430,607 | 7/1995 | Smith . |

(List continued on next page.)

FOREIGN PATENT DOCUMENTS

| | | |
|---|---|---|
| 60-183621 | 9/1985 | (JP) . |
| 62-10494 | 1/1987 | (JP) . |
| 64-2397 | 1/1989 | (JP) . |
| WO 97/12313 | 4/1997 | (WO) . |

*Primary Examiner*—Lynn D. Feild
(74) *Attorney, Agent, or Firm*—George C. Limbach

(57) ABSTRACT

A portable computer with a base (22) containing media, batteries, and keyboard, with the a CPU 52 and main PCB 50 located in a planar CPU module (28) separate from and behind the flat-panel display module (26), mechanically connected to the display module (26) with a deployment mechanism, and functionally connected to the display module (26) and base (22) by a base flexible circuit (78). The CPU module contains a heat-spreading front cover 46 facing the display module 26, and thermally connected to hot components on the main PCB 50. The translating mechanism operates such that when the display module (26) is closed, the CPU module (28) is adjacent to the display module (26), and when the display module (26) is open, the CPU module (28) is positioned with a gap between the it and the display module (26).

36 Claims, 21 Drawing Sheets

U.S. PATENT DOCUMENTS

| | | |
|---|---|---|
| 5,481,432 | 1/1996 | Tsukada et al. . |
| 5,504,605 | 4/1996 | Sakuma et al. . |
| 5,537,343 * | 7/1996 | Kikinis et al. ......................... 361/687 |
| 5,552,960 * | 9/1996 | Nelson et al. ......................... 361/687 |
| 5,606,341 | 2/1997 | Aguilera . |
| 5,612,852 * | 3/1997 | Leverault et al. ................... 361/687 |
| 5,621,613 | 4/1997 | Haley et al. . |
| 5,628,363 | 5/1997 | Dewar et al. . |
| 5,634,351 | 6/1997 | Larson et al. . |
| 5,646,822 | 7/1997 | Bhatia et al. . |
| 5,666,261 | 9/1997 | Aguilera . |
| 5,718,282 | 2/1998 | Bhatia et al. . |
| 5,768,101 * | 6/1998 | Cheng ................................... 361/687 |
| 5,774,333 | 6/1998 | Janik et al. . |
| 5,818,693 * | 10/1998 | Garner et al. ......................... 361/687 |
| 5,919,582 * | 7/1999 | Pedicini et al. ......................... 429/27 |
| 5,953,206 * | 9/1999 | Jondrow ................................. 361/687 |
| 5,982,617 * | 11/1999 | Haley et al. ......................... 361/687 |
| 6,023,410 | 2/2000 | Chu et al. . |

* cited by examiner

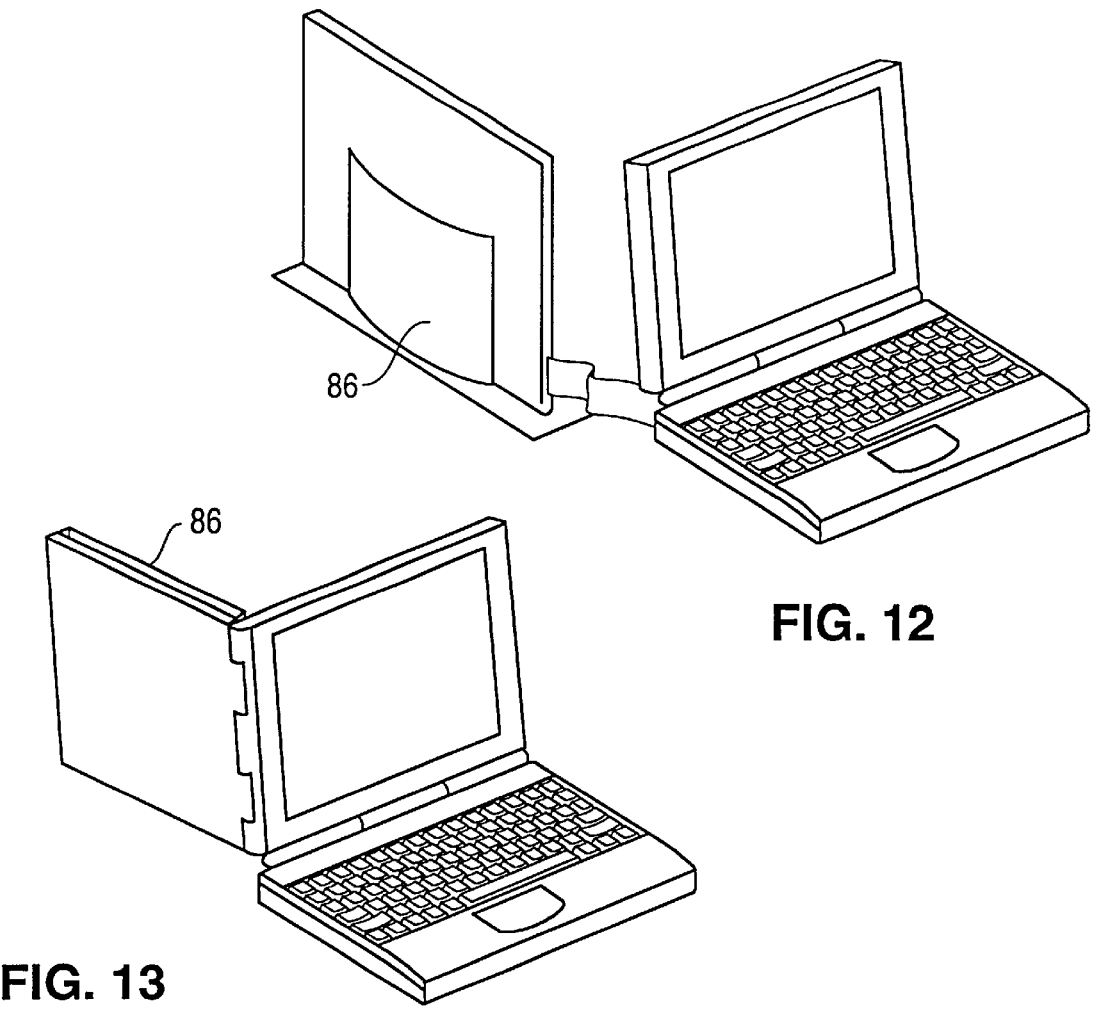
FIG. 12
FIG. 13
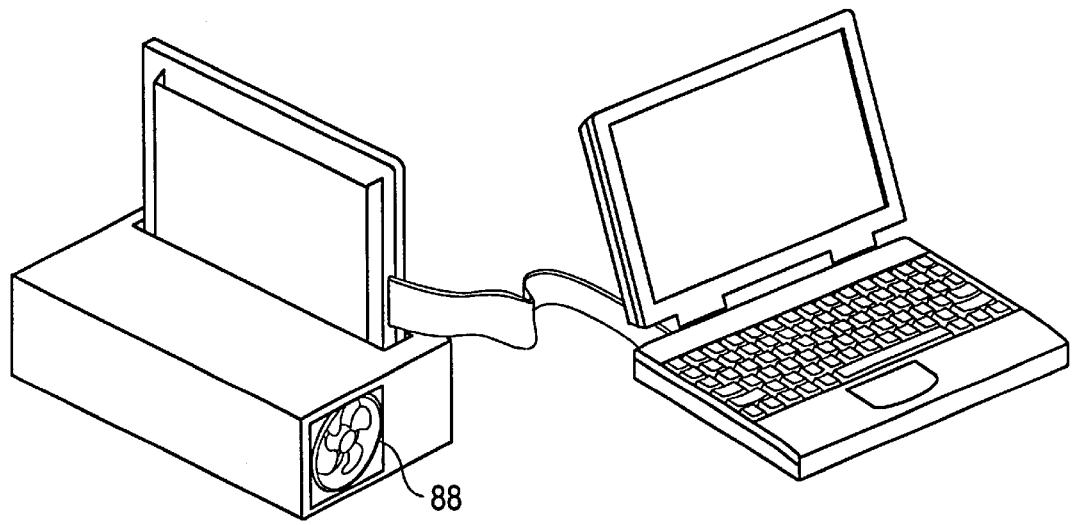
FIG. 14

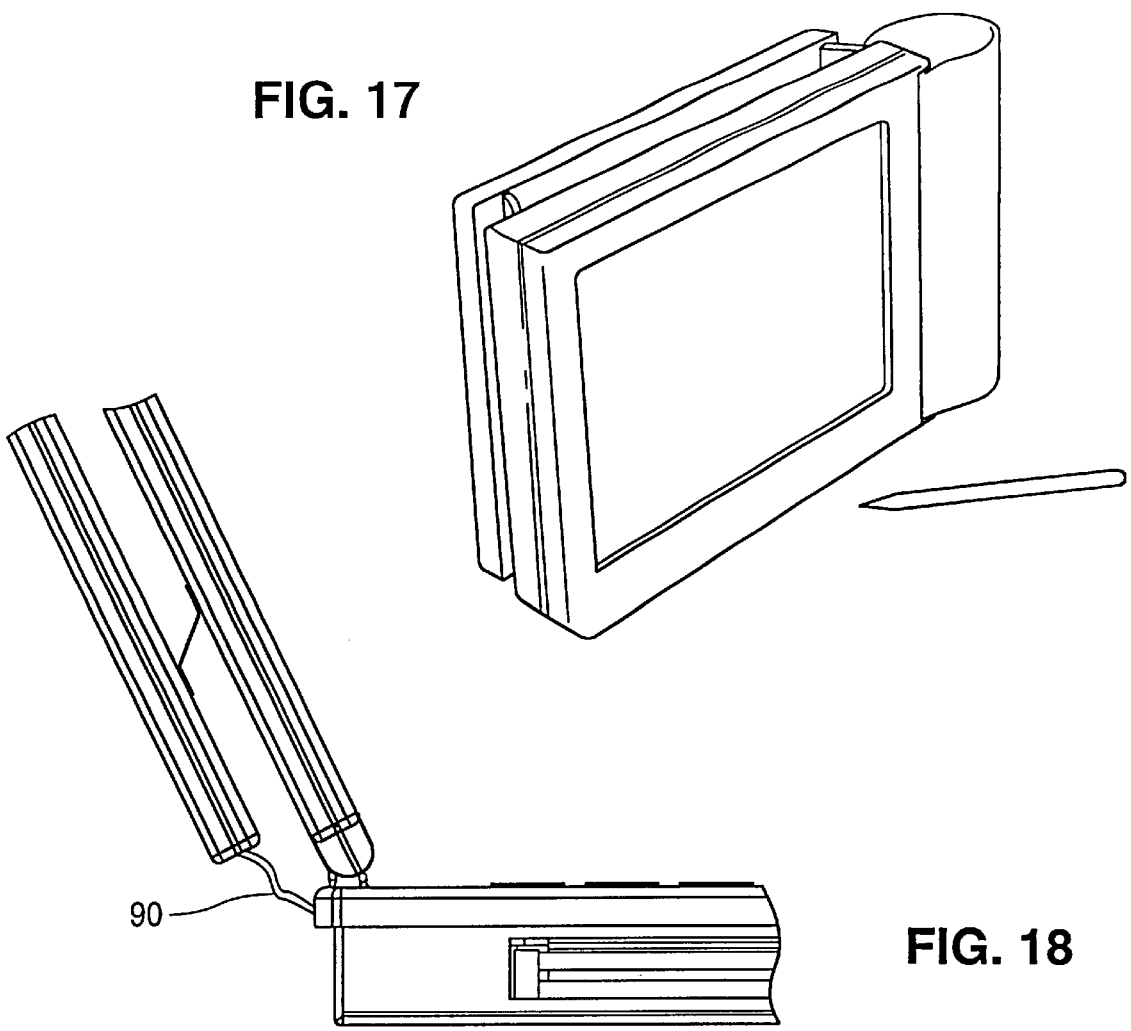
FIG. 17
FIG. 18
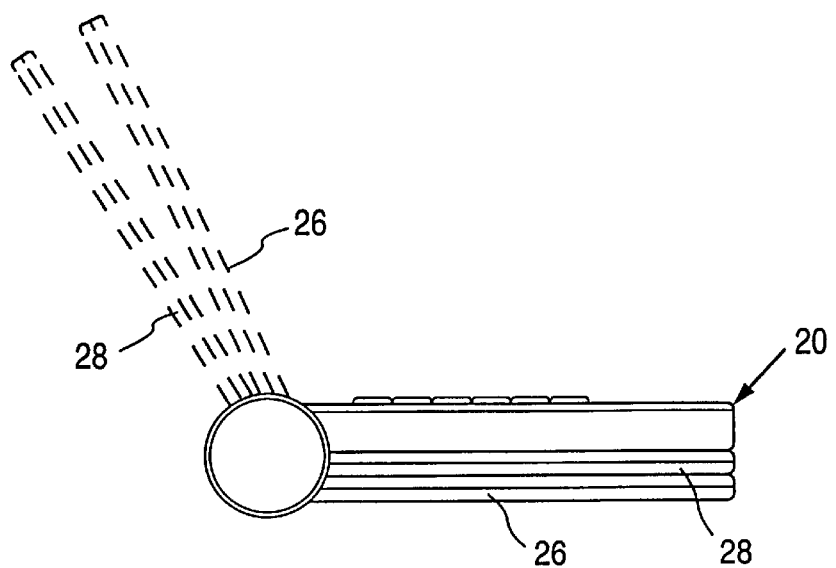
FIG. 19

THERMALLY EFFICIENT COMPUTER INCORPORATING DEPLOYING CPU MODULE

This application is a Continuation-in-Part of Ser. No. 08/708,093 filed Aug. 23, 1996 U.S. Pat. No. 5,774,333.

BACKGROUND—FIELD OF INVENTION

This invention relates generally to the field of portable computers, and more specifically to a design for laptop and notebook computers wherein the CPU and motherboard is contained in a substantially planar module that mechanically separates away from a display module when the computer is being used.

1. Definitions

The term portable computer includes laptops and notebook computers, and some Personal Digital Assistants. Typically, these computers have a flat-panel display connected to a base by a hinge. The display is shut for transport or storage, and rotated open for use. The base may contain an integral or removable keyboard on the top surface, storage media, batteries, and other components. A portable computer may also feature other user-interface systems, such as a pen-based interface, instead of, or in addition to, a keyboard.

CPU module is defined as a housing containing a substantially planar printed-circuit board or assembly of boards, generally in the same plane, containing at least the central-processing unit (CPU), and possibly additional integrated circuits and other components that may be included on a motherboard.

The flat-panel display module is defined as a flat-panel display, such as an liquid crystal display, in a housing comprised of a bezel and a rear cover in a clam-shell configuration.

2. Background—Description of Prior Art

The rapid growth of the portable computer market demonstrates that computer users prefer the freedom to work in different locations that these computers afford. Increasingly, portables are being purchased by both individuals and large firms as desktop replacement computers. As a result, there is a need for portables that can provide performance comparable to desktop models. Performance is considered to be a combination of the fastest CPUs and support circuitry; the ability to handle a range of media types such as high capacity hard disk drives and CD-ROMs; fast, high resolution video processing; and connectivity functionality provided by networking and other ports. Unfortunately, there is a problem combining all of these components into a single, small enclosure. As the system tends toward thermal equilibrium, the thermal sum of the components raises the temperature above the specified operating temperature of some or all of the components. CPUs in particular have a proportional relationship between processing power and thermal output.

Another performance criteria for portable computers is battery life. Some portables use a fan to cool the hot components. The combination of high performance, high thermal output components, and a fan to cool them, add up to an increase in power drain that reduces battery life.

The size of portable computers is one of the most important performance constraints. Given similar computing performance features, users prefer to purchase the product with the smallest form factor. In fact, many consumers make the purchase decision based on the advertised length, width, and thickness dimensions of the product.

U.S. Pat. No. 5,313,362 to Hatada et al (1994) shows a portable computer with the motherboard located in the base of the unit. This design does not anticipate the new art shown herein for several reasons. First, the location of the motherboard is in the base, not in a mechanically and thermally separate module. All of the heat producing components are located within the base enclosure and are thus thermally coupled. At thermal equilibrium, the temperature in the CPU will be limited by the most thermally sensitive component. Second, FIG. 3 of Hatada et al shows a radiator located in a rear base protrusion. This radiator substantially increases the footprint of the computer and is therefore undesirable in a portable or desktop version where desk space is highly valued. FIG. 10 of Hatada et al shows an auxiliary radiator that is able to rotate away from the flat-panel display so that heat is not transferred to the display. The Hatada et al art relies on convection through vent holes in the main base housing. Thus, the base cannot be effectively sealed from the intrusion of foreign objects, dust, or spilled liquids. Additionally, cooling efficiency is inversely related to thinness since the airflow must have sufficient unrestricted volume to be effective. As the space between the bottom radiator and base housing increases, the unit becomes taller. Furthermore, natural convection off of the bottom side of the primary, high-temperature radiator, is approximately half as efficient as that off the vertical radiator. If vent holes are not used, Hatada et al relies on conduction and convection of heat from external surfaces that the user can touch. The total amount of heat that can be radiated from the computer is limited by the surface touch temperature, shown in Hatada et al FIG. 6 as 55 degrees C. In this case, an increase in heat dissipation can only be realized by an increase in surface area, and thus an increase in the size of the unit.

Both U.S. Pat. No. 4,980,848 to Griffin et al (1990), and U.S. Pat. No. 4,084,213 to Kirchner et al (1978) show a computer having a circuit board with a plurality of heat producing components mounted directly behind the flat-panel display in a single housing. When this display assembly is opened, the motherboard is located in an inclined position. Vents are located at the top and bottom of the assembly housing allowing air to pass between the flat-panel display and the motherboard.

These configurations are not viable for several reasons. First, consumers demand the maximum computing power in the smallest package, thus, laptop and notebook computers are under tight size constraints. As display sizes increase, thickness becomes an important metric; the thinner the computer, the smaller it appears when closed and the easier it is to transport. Thinness is inversely related to thermal efficiency in both the Griffin et al and Kirchner et al art. If the air spaces on either side of the motherboard are minimized, airflow is restricted and there is less convective cooling effect. Moreover, in this configuration with the motherboard in close proximity to the flat-panel display, the uneven, high temperatures on the motherboard will be transferred to the flat-panel display causing irregularities in display contrast that could make the display unreadable. In fact, a fast, hot CPU could push the flat-panel display past its specified operating temperature, rendering it inoperable. Compounding this problem is that the majority of the heat from the CPU and motherboard must be dissipated to the flat-panel display side of the motherboard. This is due to the fact that there is a touch temperature limit on the rear surface of the display/motherboard housing. If a large quantity of heat is allowed to reach this outer surface it could burn a user. The result is that the CPU is limited in its thermal, and thus, it's computational power output.

Alternatively, if the spaces between the motherboard, flat-panel display, and rear cover are increased to make the airflow less restrictive, the overall thickness of the computer increases, making it bulky and inconvenient to carry and stow. Griffin et al describes bosses that support the circuit board being of sufficient length so that the boards are spaced a substantial distance from the LCD, thus the computer is substantially thicker than a conventional design with the CPU and motherboard in the base.

Another problem with Griffin et al and Kirchner et al is that both show vent holes that allow foreign objects or spilled liquids to enter the housing, potentially causing physical damage or shorts on the motherboard. If the vents are made smaller to prevent this, airflow is restricted, thereby decreasing the convective cooling efficiency of the design.

Additionally, the vent holes prevent the housing from being used as a shield element to fully contain electromagnetic interference (EMI). Electronic devices such as portable computers must be shielded so that they emit a small amount of EMI, as prescribed by law. As processor speeds increase, the wavelength of the EMI energy decreases, with the result that more energy will escape through a given size opening in the shield. Many computers use the housing as a shield element. Plastic housings may be coated on the inside surface with a thin layer of electrically conductive material. Griffin et al and Kirchner et al preclude the use of the outer housing as the only EMI shield since EMI will escape from the sizable thermal vent holes.

The Griffin et al and Kirchner et al art also inherently limits the efficiency of heat transfer when a fan is added to the system for forced convection due to the restriction created by the vent holes.

SUMMARY OF INVENTION

The present invention exemplifies a new and unobvious art of a portable notebook or laptop computer. Briefly and generally, this design for a thermally efficient portable computer is comprised of the following: a base containing storage media, power supply, connectors, and keyboard; a display module consisting of a flat-panel display, a front bezel, and a rear cover; a CPU module consisting of a main circuit board (motherboard) with CPU, support ICs and associated circuitry, an inner heat-spreading front cover plate thermally connected to the motherboard components, and a rear cover; a deploying mechanism by which the motherboard module is physically separated from the display module when the display is opened; and an extensible signal relaying means through which continuity of electrical signals is maintained between the motherboard and display module, and between the motherboard and base.

OBJECTS AND ADVANTAGES

The main advantage of the design shown herein is that it allows for the use of more powerful and thus thermally hotter components by simultaneously maximizing the effect of convective cooling while the computer's display is open and being used, and minimizing the size of the computer when it is stowed. When the computer is closed, the CPU module rests against the flat-panel display module. The difference in thickness between the design shown herein and a conventional laptop is very small. At the very least, it is the sum of the material thicknesses of the flat-panel display module rear cover and the CPU module heat-spreading front cover, as these planar elements are adjacent when the unit is closed. The combined dimensions may be as small as 1 mm. These two elements are the only additional components that necessarily add height when compared to a conventional design.

The increased cooling efficiency stems from the arrangement of the heat producing components in the CPU module, the inclined position of the CPU module, and the isolation of the heat sensitive components. The inner heat-spreading front cover is thermally connected to motherboard components, thus heat is conducted to the heat-spreading front cover. The heat energy conducted to the heat-spreading front cover will tend to spread evenly across it, producing an effective increase in surface area by which heat is transferred to the air. Because of the inclined position of the CPU module, this heat is then carried away from the heat-spreading front cover by air rising along it.

Another advantage is that the CPU and motherboard are completely enclosed in a module and are not exposed to the outside environment Most products that require either natural or forced convection suffer from over-heating due to dust buildup over time. Since the art presented herein doesn't require vent holes, the CPU module could be made splash and dust proof.

Yet another advantage in this design is that the CPU module, flat-panel display module, and base are thermally isolated from one another. The CPU module separates away from the flat-panel display module such that there is very little heat transfer between the two. The result is that the CPU and motherboard subsystem can be run much hotter without effecting heat sensitive components such as the flat-panel display, PC Card media, or optical disk laser diode.

Still another advantage with this design is that the CPU (the hottest component) can be run much hotter than in a conventional laptop because the heat is conducted to a surface that is not on an outer surface of the computer, and is thus not user accessible. Most portable computers available on the market have the CPU close to the bottom surface of the device. In this conventional configuration, the CPU is limited in it's thermal (and thus processing) power output based on the temperature it induces in the bottom surface of the computer.

Further objects and advantages of the present invention are:

(a) to provide a portable computer that maximizes the heat transfer from the hot components of the motherboard via natural or forced convection while minimizing the thickness of the portable when it is stowed or carried.

(b) to provide a computer wherein the heat producing elements of the motherboard are thermally connected to a spreader, the other side of which is directly exposed to minimally restricted airflow, and which is in a substantially inclined position when in use.

(c) to provide a portable computer design wherein the motherboard is contained in a housing where one of the substantially planar sides is thermally attached to the heat producing components of the motherboard, and is constructed of a material with high thermal conductivity and electrical conductivity, so that it simultaneously spreads heat for more efficient convective transfer of heat to the outside air, and provides an EMI shield for the high frequency components.

(d) to provide a portable computer with a CPU module that deploys away from the main computer such that the heat producing elements thermally connected to a protected inner surface cannot be contacted by the user.

(e) to provide a portable computer that is efficiently cooled while effectively protecting the motherboard against damage from foreign objects, dust, or liquids.

(f) to provide a portable computer with an inclined CPU module that translates away from a flat-panel display module during use, whereby the motherboard module contains no gaps for the EMI that is generated by the CPU or motherboard, to escape.

(g) to provide a portable computer with the CPU contained in a housing that deploys away from a flat-panel display module such that modules are thermally isolated, so that components in the CPU module can run hotter without causing visual irregularities in the flat-panel display.

(h) to provide a computer with the hot components configured such that the restriction of the cooling air pathway is decreased so that they can be cooled more efficiently with a fan.

(i) to provide a computer with the hot components configured in a thin, substantially planar housing such that the restriction of forced convection is greatly reduced such that a low output fan can be used to cool the hot components.

(j) to provide a computer whereby the EMI emitted by the CPU and other high frequency components can be entirely shielded by the housing elements.

(k) to provided a computer whereby the major heat producing integrated circuits are contained in a thin, planar module that is easily separable and positioned vertically for efficient cooling of the said components.

(l) to provide a portable computer that can use faster, and thus hotter, CPUs and other integrated circuits, and still be contained in a small enough package to be easily transportable.

(m) to provide a computer with the hot components configured in a substantially planar CPU module such that they are efficiently cooled by natural or forced convection and such that the CPU module can be easily accessed or removed for repair or upgrade.

(n) to provide a computer that is efficiently cooled without a fan or fan noise, or with a quieter, low output fan.

(o) to provide a computer that is efficiently cooled yet can be transported or stored in a very compact form with minimal air gaps between components (p) to provide a computer than can contain hotter components and thus provide better performance, yet maintain cooler temperatures on exposed surfaces.

(q) to provide a computer with a vertical translating motherboard and a fan with little or no impact to the dimensions of the computer.

(r) to provide a computer with the means to control the direction of forced airflow to specific spots on a heat-spreading front cover.

(s) to provide a computer that is effectively cooled when docked.

Other objects and advantages of the present invention and a full understanding thereof may be had by referring to the following detailed description and claims taken together with the accompanying illustrations. The illustrations are described below in which like parts are given like reference numerals in each of the drawings.

BRIEF DESCRIPTION OF THE DRAWINGS

FIG. 12 shows a configuration wherein the CPU module sub-assembly 28 is completely mechanically separable.

FIG. 13 shows a configuration where CPU module sub-assembly 28 pivots along the side.

FIG. 14 shows a configuration where CPU module sub-assembly 28 is positioned vertically in a docking station.

FIG. 17 shows a portable computer configured with a pen-based user-interface.

FIG. 18 is a fragmentary side view of the flat-panel display computer 20 with a shape-memory alloy actuation element.

FIG. 19 is a side view of the flat-panel display computer 20 with the CPU module stored adjacent to the base.

Figure 1:
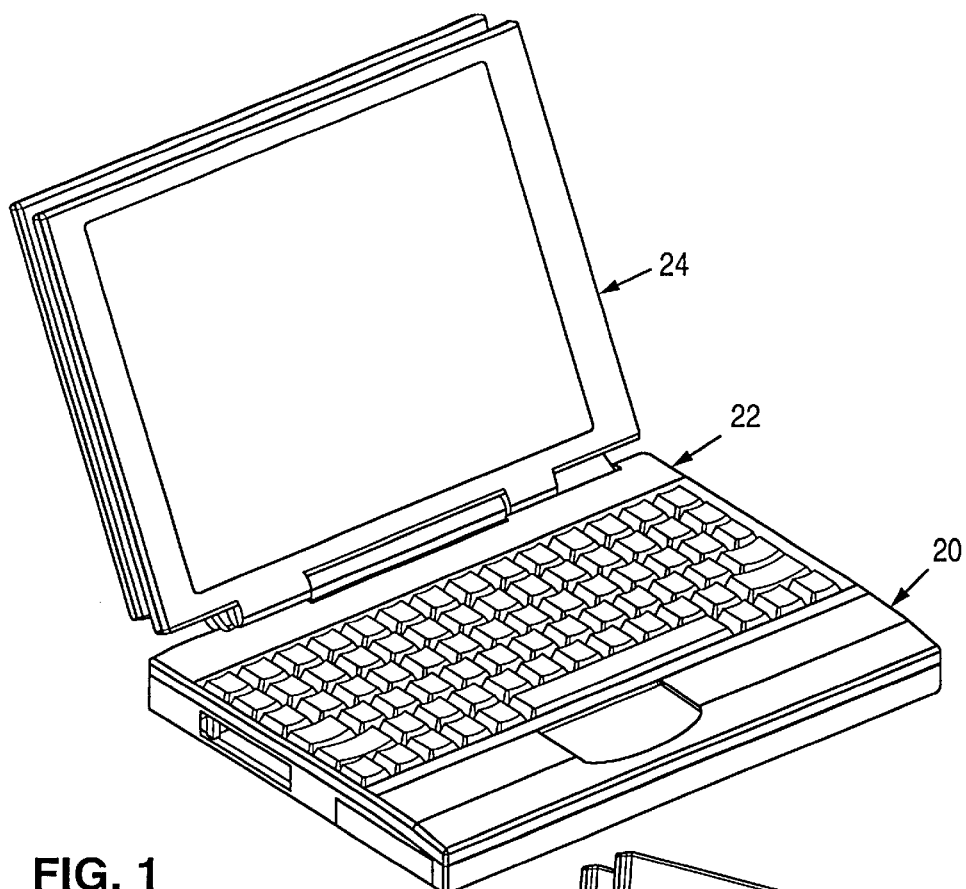
FIG. 1 is a front perspective view of the present flat-panel display computer 20 with its lid assembly 24 open.

| Drawing Reference Numerals | |
|---|---|
| Flat-panel Display Computers | 20 |
| Base Assembly | 22 |
| Lid Assembly | 24 |
| Display Module Sub-Assembly | 26 |
| CPU Module Sub-Assembly | 28 |
| Flat-Panel Display | 30 |
| Display Inverter Circuit Board | 32 |
| Display Bezel | 34 |
| Display Rear Cover | 36 |
| Hinge Assembly | 38 |
| Rod Clamp | 40a, b |
| Hinge Bearing | 42a, b |
| CPU Module Bezel | 44 |
| heat-spreading front cover | 46a, b |
| CPU Module Rear Cover | 48 |
| Main PCB (printed circuit board) | 50 |
| CPU | 52 |
| Thermally Conductive Interface Material | 54 |
| Pusher Link | 56 |
| Cover Link | 58 |
| Module Flexures | 60a, b, c, d |
| Hard Disk Drive | 62 |
| Media Bay | 64 |
| Input/Output Connectors | 66 |
| Connector Board | 68 |
| PCMCIA Module | 70 |
| Keyboard Sub-Assembly | 72 |
| Battery Pack | 74 |
| Track Pad | 76 |
| Base Flexible Circuit | 78 |
| Support ICs | 80 |
| Base Bottom Cover | 82 |
| Base Top Cover | 84 |
| Extensible Heat Shield | 86 |
| Fan | 88 |
| Shape-Memory Alloy Element | 90 |
| Vent holes | 92 |
| Duct | 94 |
| flat-panel display flexible circuit | 96 |
| Portable Computer Dock | 98 |
| collapsible channel | 100 |
| indented air channel | 102 |
| nested duct | 104 |
| gap-covering wall | 106 |
| heatpipe | 108 |
| lug | 110 |
| flexure slotted hole | 112 |

DESCRIPTION OF PREFERRED EMBODIMENT

Figure 2:
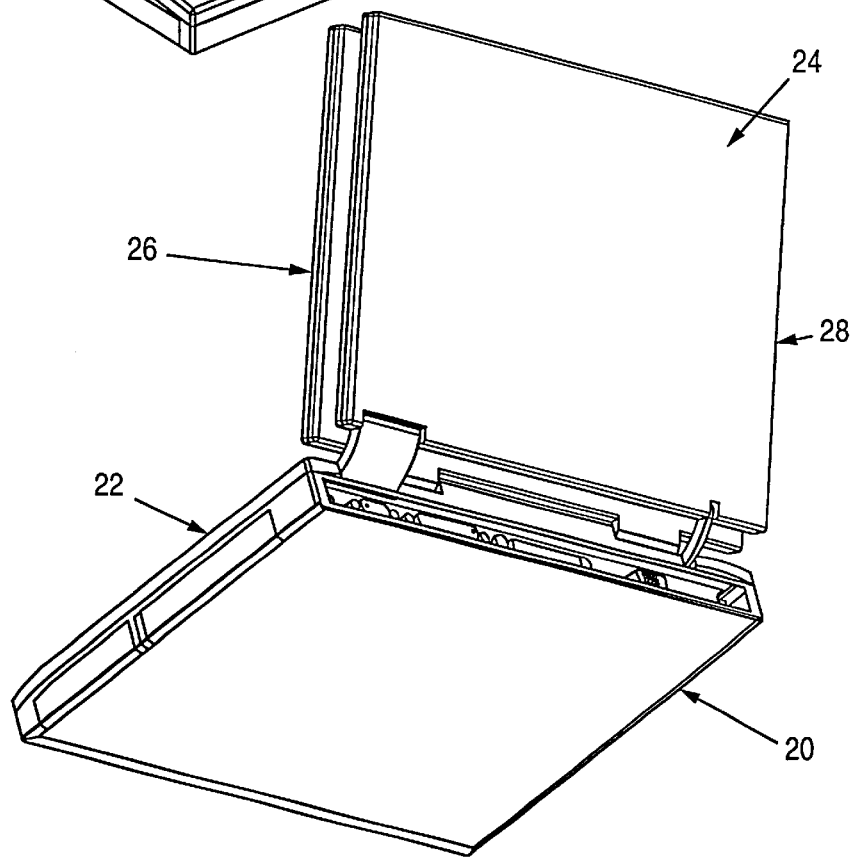
FIG. 2 is a rear perspective view of the present flat-panel display computer 20 illustrated in FIG. 1.
Figure 6:
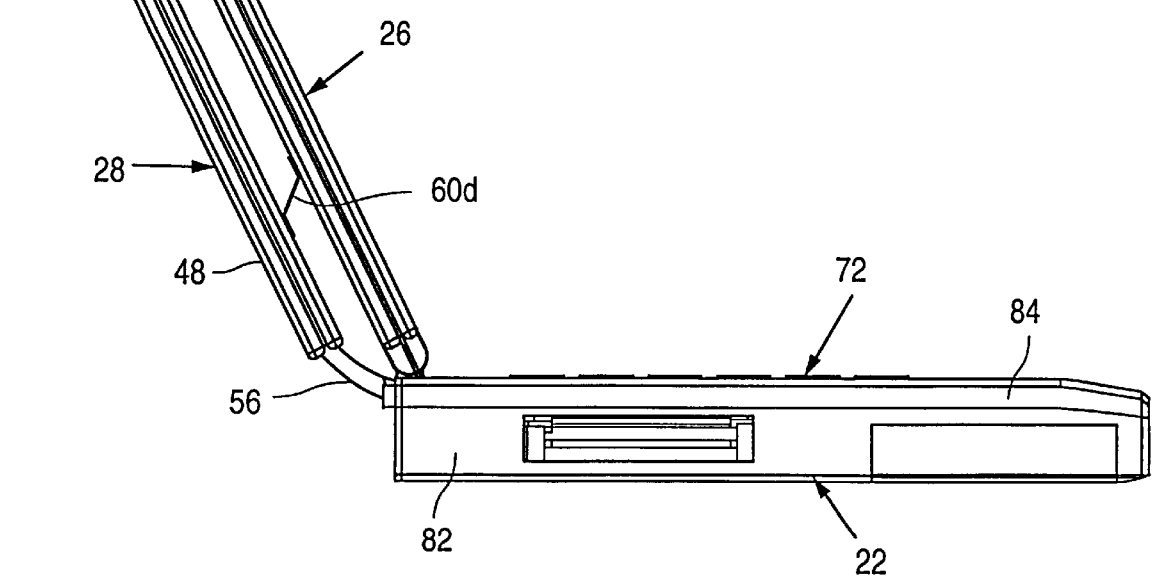
FIG. 6 is a left side view of the present flat-panel display computer 20 illustrated in FIGS. 1 and 2
Figure 7:
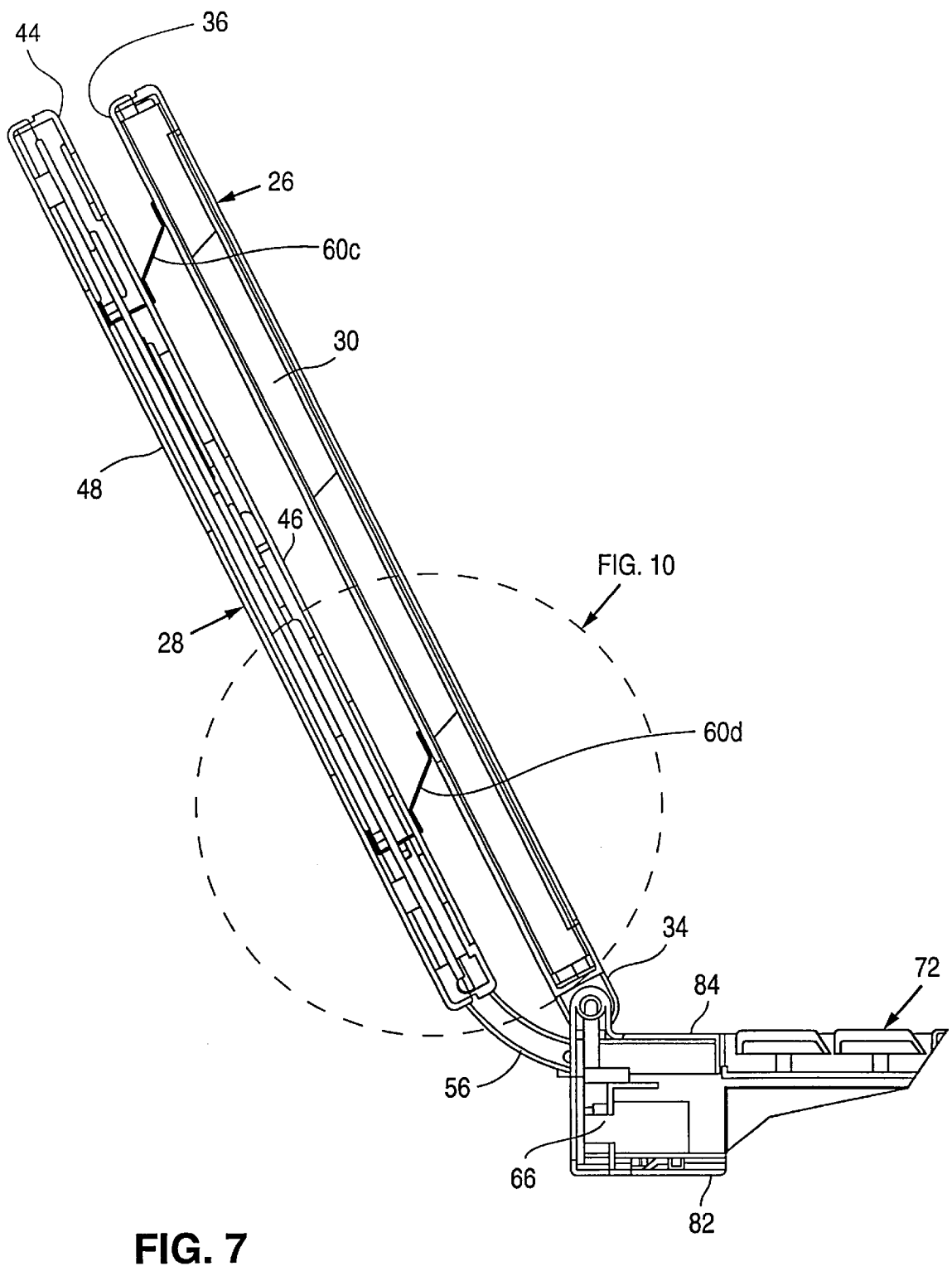
FIG. 7 is a fragmentary left side cross-section view of the present flat-panel display computer 20, taken generally along line 7—7 of FIG. 3

Referring to the drawings, particularly FIGS. 1 and 2, a flat-panel display computer 20 is illustrated according to the present invention and is seen to generally include a base assembly 22 pivotally mounted to a lid assembly 24. As seen in FIGS. 6 and 7, lid assembly 24 generally includes a display module sub-assembly 26 and a CPU module sub-assembly 28.

Figure 9:
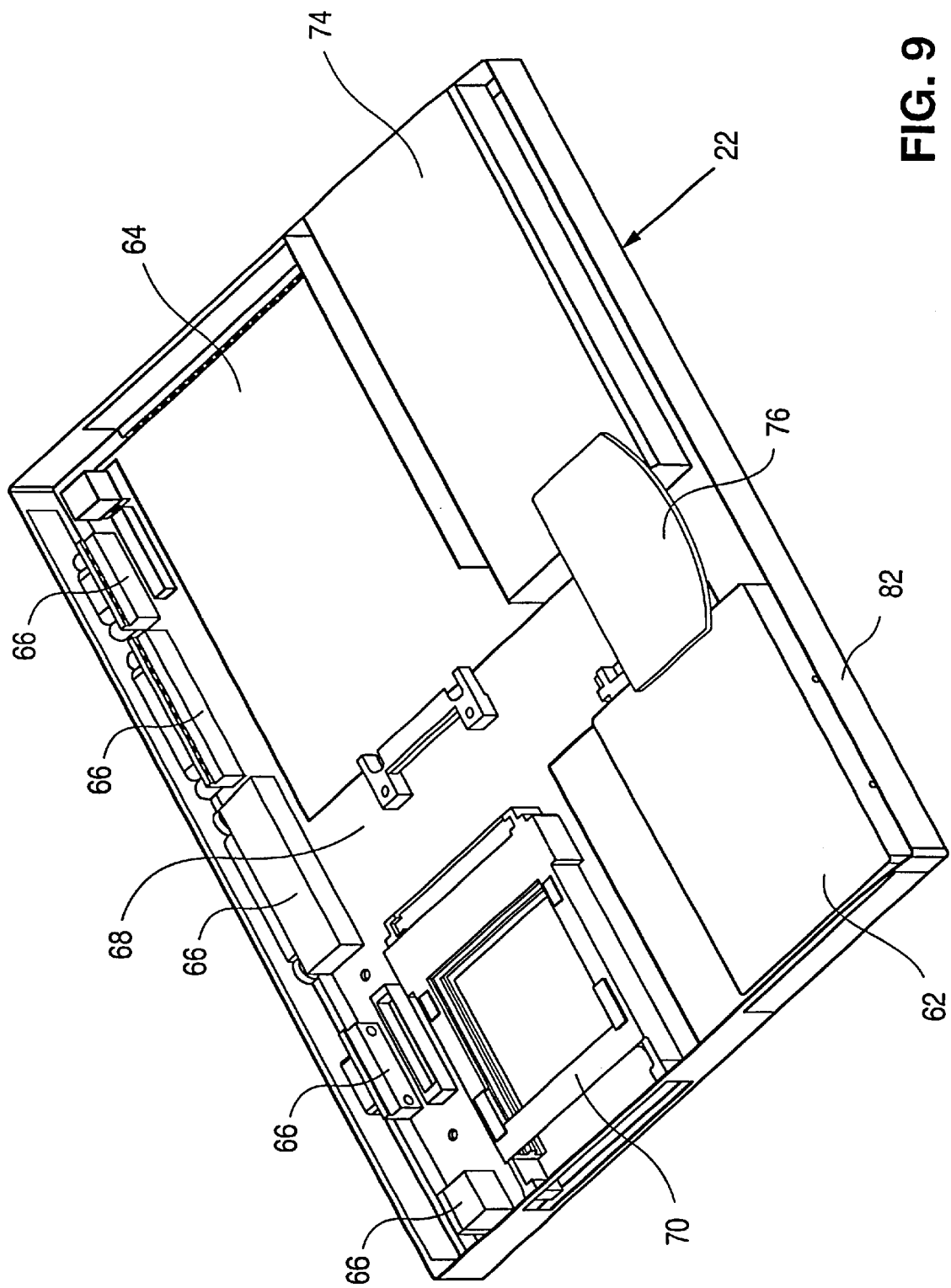
FIG. 9 is a front perspective view of the base assembly 22 with the keyboard sub-assembly 72 and base top cover 84 removed for clarity.

As seen in FIGS. 6, 7, and 9, base assembly 22 houses a hard disk drive 62, a media bay 64, a plurality of input/output connectors 66, a connector board 68, a PCMCIA module 70, a keyboard sub-assembly 72, a battery pack 74, and a track pad 76. Track pad 76 is a touch-sensitive pointing device used to control the on-screen cursor. These components are contained by a base bottom cover 82 and a base top cover 84. Base bottom cover 82 and base top cover 84 are arranged in a clam-shell configuration.

Figure 3:
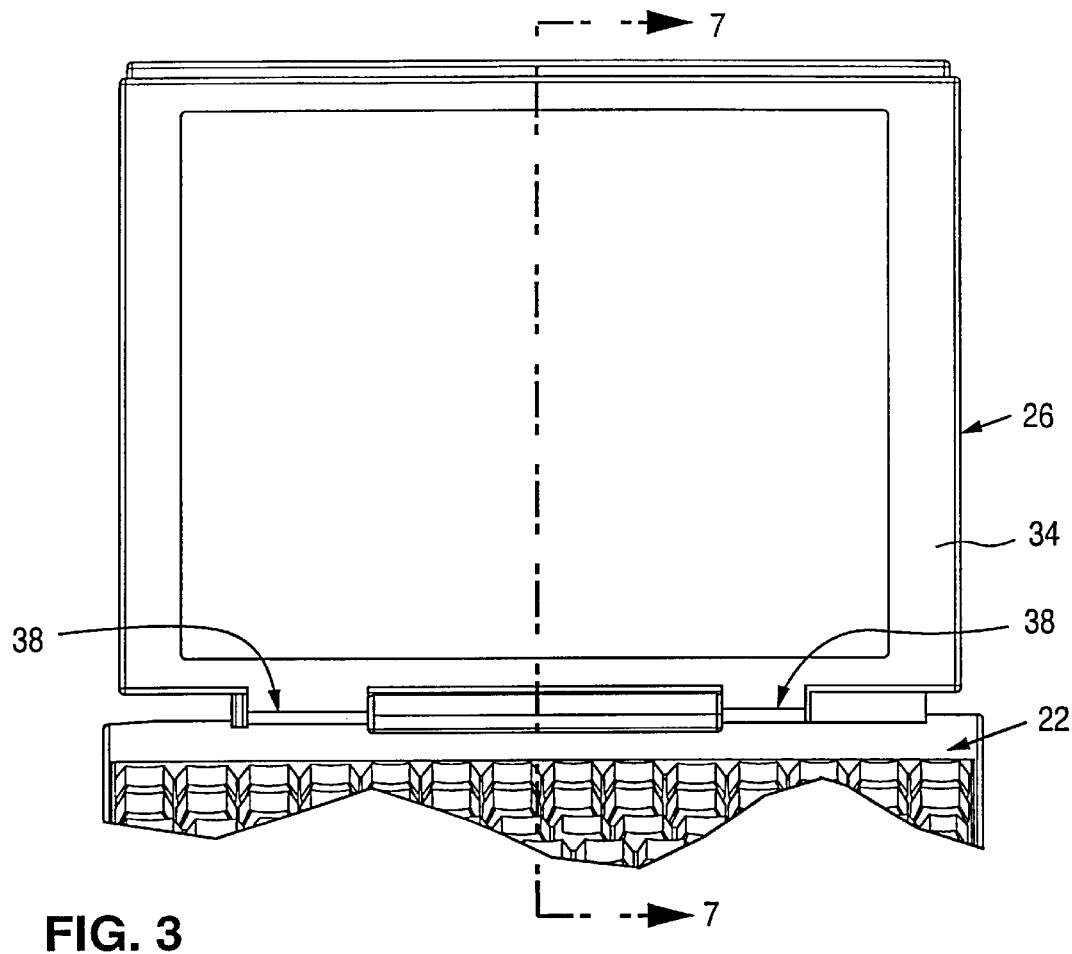
FIG. 3 is a fragmentary front view of the lid assembly 24 illustrated in FIGS. 1 and 2.
Figure 4:
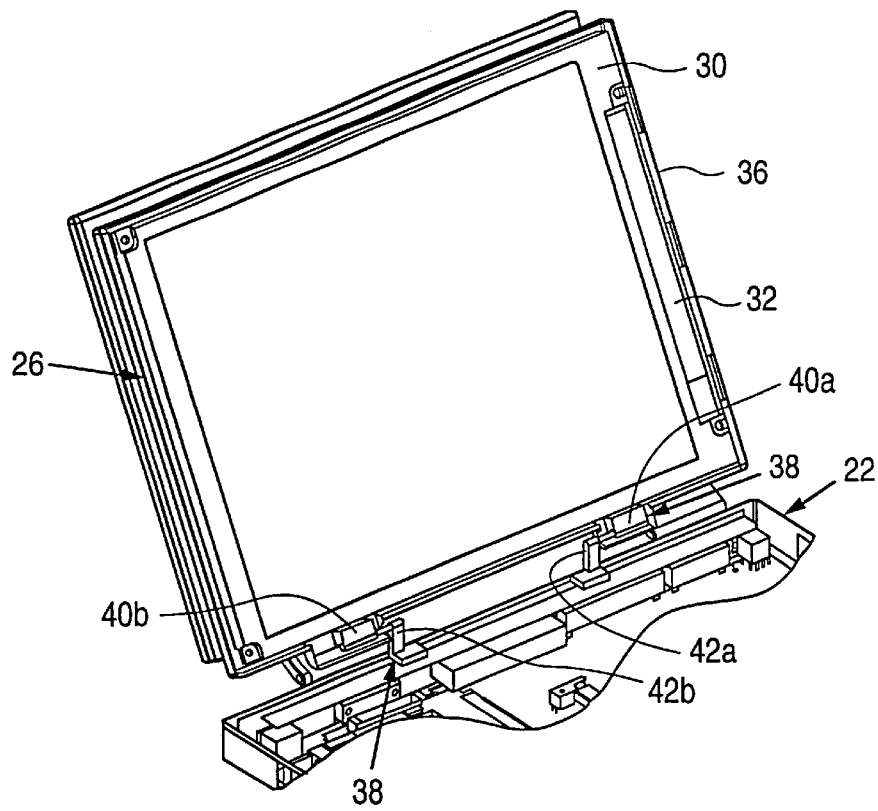
FIG. 4 is a fragmentary front perspective view of the lid assembly 24 illustrated in FIG. 3 with display bezel 34 removed for clarity

Display module sub-assembly 26 is generally comprised of a display bezel 34 and a display rear cover 36 which are arranged in a clam-shell fashion to house a flat-panel display 30 and a display inverter circuit board 32 (see FIG. 4). As seen in FIGS. 3 and 4, display module sub-assembly 26 is essentially rectangular with both display bezel 34 and display rear cover 36 having a pair of downward projecting portions that enclose a hinge assembly 38. Hinge assembly 38 consists of a set of rod clamps 40a and 40b, which are fixed to display rear cover 36, and pivotally connected to a set of hinge bearings 42a and 42b, which are carried by base assembly 22. In this way, display module sub-assembly 26 is pivotally mounted on base assembly 22.

Figure 5:
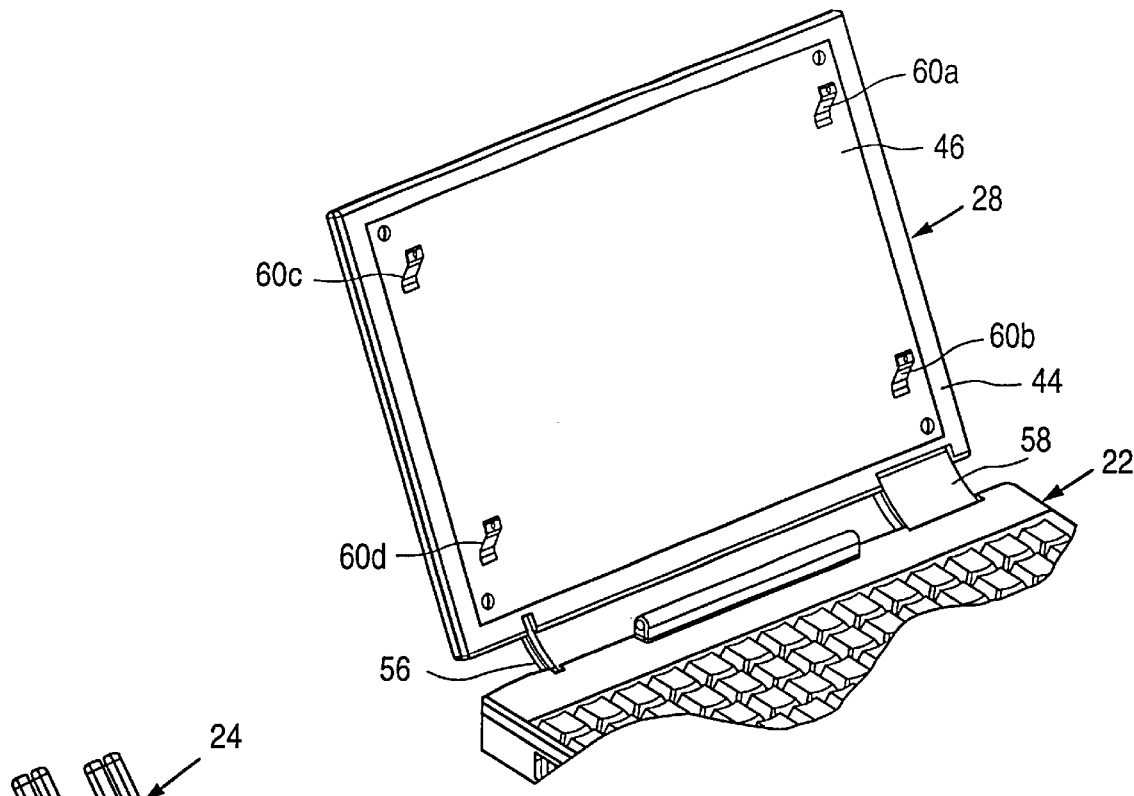
FIG. 5 is a fragmentary front perspective view of the lid assembly 24 illustrated in FIG. 3 with display module 2 removed for clarity
Figure 10:
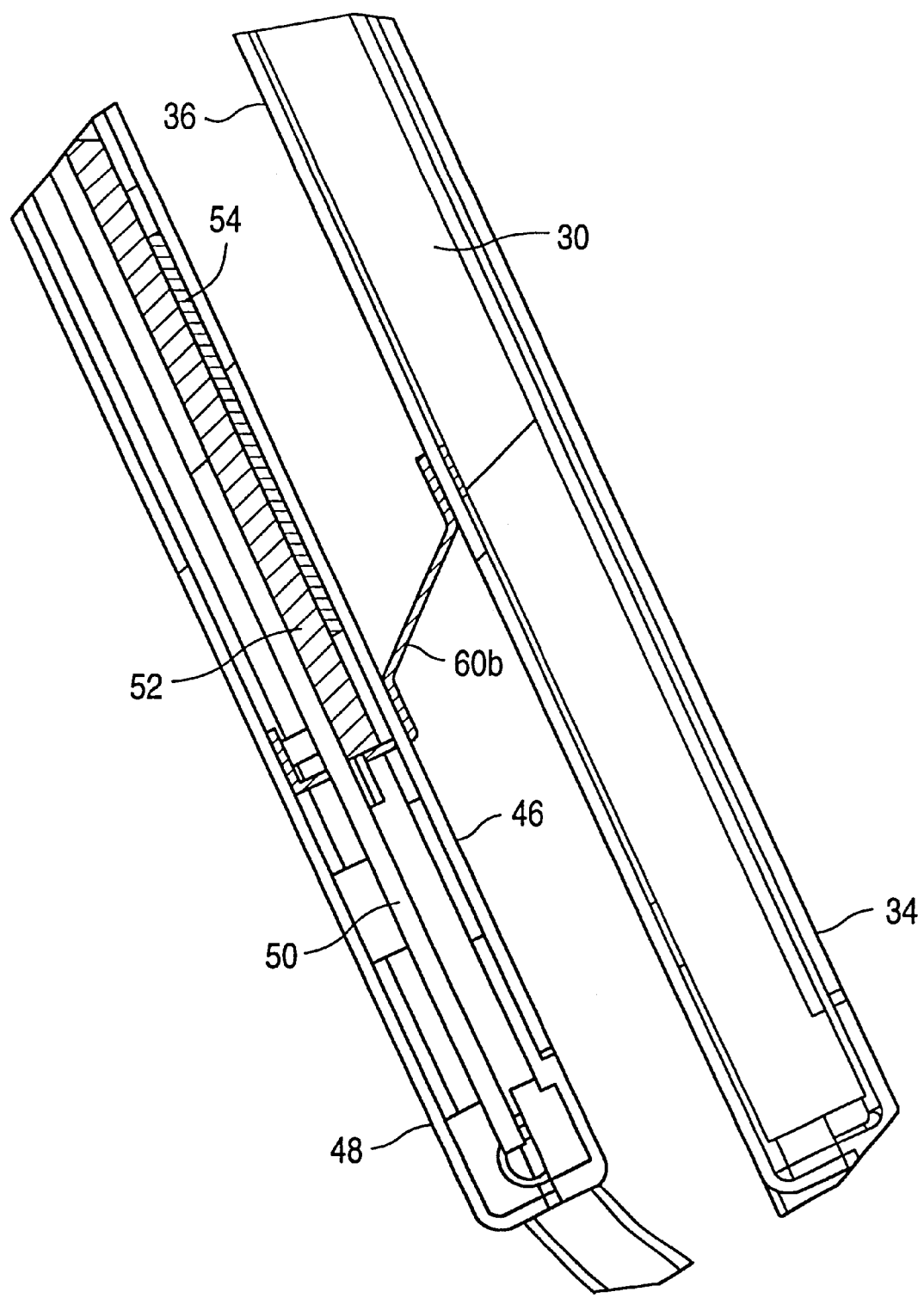
FIG. 10 is a fragmentary cross-section detail view of the CPU module sub-assembly 28 taken generally along line 7—7 of FIG. 3

As seen in FIGS. 5, 6, and 7, CPU module sub-assembly 28 is generally comprised of a CPU module bezel 44 that supports a heat-spreading front cover 46, a CPU module rear cover 48 arranged in a clam-shell fashion with CPU module bezel 44. CPU module sub-assembly contains a CPU 52, and a main PCB 50 (see FIGS. 8 and 10). Viewing FIGS. 7, 8, and 10, CPU 52 is mounted directly on main PCB 50 so as to minimize the overall thickness of CPU module sub-assembly 28. Both CPU 52 and a plurality of support ICs 80 are thermally connected to heat-spreading front cover 46 via a thermally conductive interface material 54, such as Chomerics Cho-Therm T274 thermal interface material. Pivotally attached to the lower portion of CPU module sub-assembly 28 are a pusher link 56 and a cover link 58. The opposite ends of pusher link 56 and cover link 58 are pivotally attached to base assembly 22. The axes of pusher link 56 and cover link 58 mounted in base assembly 22 are not co-linear with the axes of hinge assembly 38. Connecting display module sub-assembly 26 and CPU module sub-assembly 28 are four compliant module flexures 60a, 60b, 60c, and 60d (see FIG. 5).

FIG. 6 shows that display module sub-assembly 26 and CPU module sub-assembly 28 are located parallel to each other, preferably with a space of 4 mm to 8 mm, when the device is in the open position. The close spacing of the two modules provides a touch access limiting feature.

Figure 8:
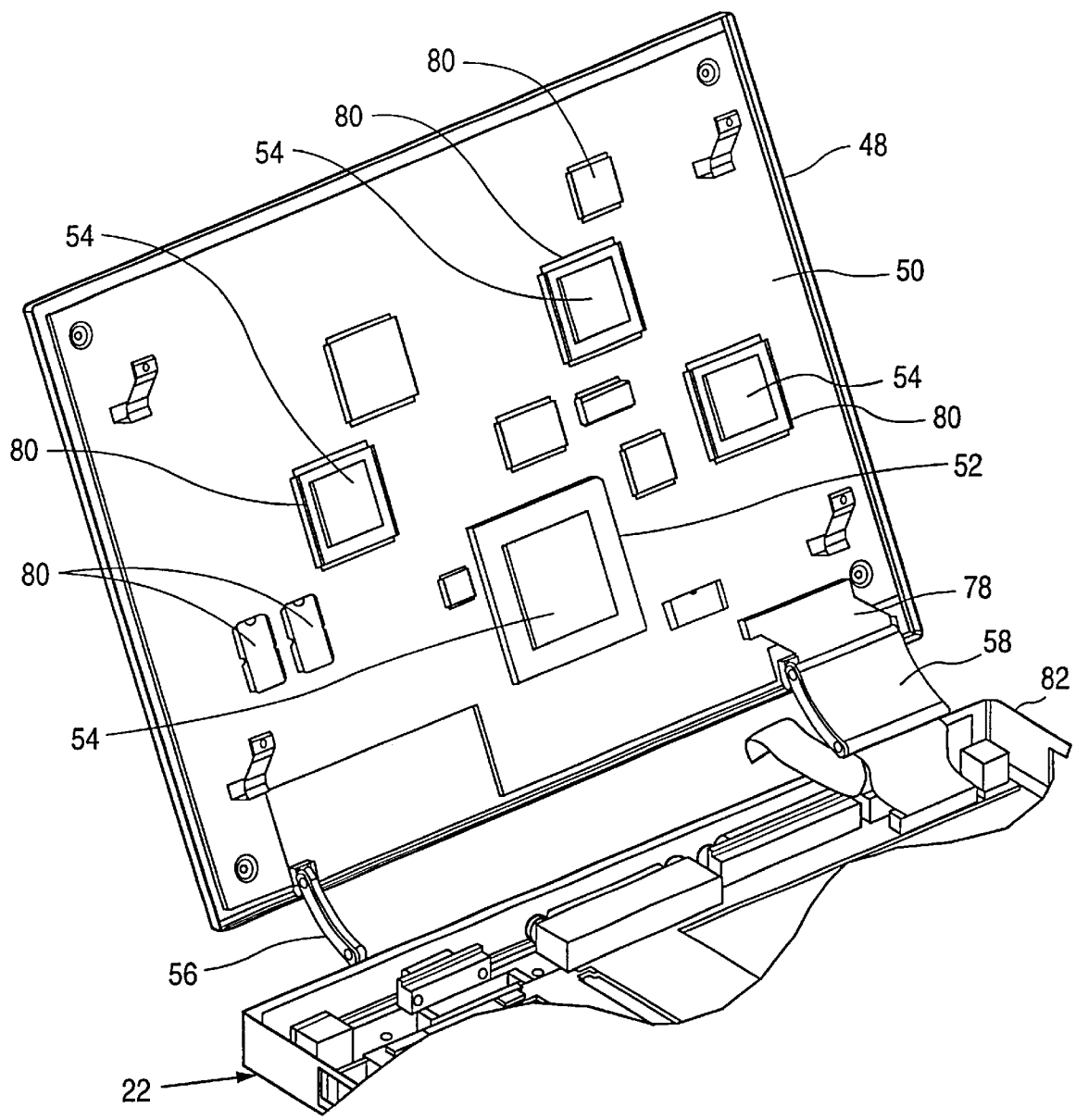
FIG. 8 is a front perspective view of the CPU module sub-assembly 28 with the display module sub-assembly 26, heat-spreading front cover 46, and CPU module bezel 44 removed for clarity.

As seen in FIG. 8, main PCB 50, CPU 52, and a plurality of support ICs 80 are electrically connected. As seen in FIGS. 7 and 8, a base flexible circuit 78 is connected to the lower right area of main PCB 50 and extends through cover link 58 into base bottom cover 82. Here base flexible circuit 78 separates into two lengths, one of which carries the electrical signals and power for flat-panel display 30 and display inverter circuit board 32. This partition of base flexible circuit is routed up through hinge assembly 38 to display module sub-assembly 26. The other partition of base flexible circuit 78 transmits signals between main PCB 50 and the modules in base assembly 22 as well as power from base assembly 22 to main PCB 50.

It should be understood that main PCB 50, CPU 52, connector board 68 and display inverter circuit board 32 are shown somewhat diagrammatically in the drawings. In actuality, additional chips and circuitry would virtually fill the boards but have been eliminated solely for drawing simplicity. Next, the operation and effect of the above embodiment will be described.

Figure 11:
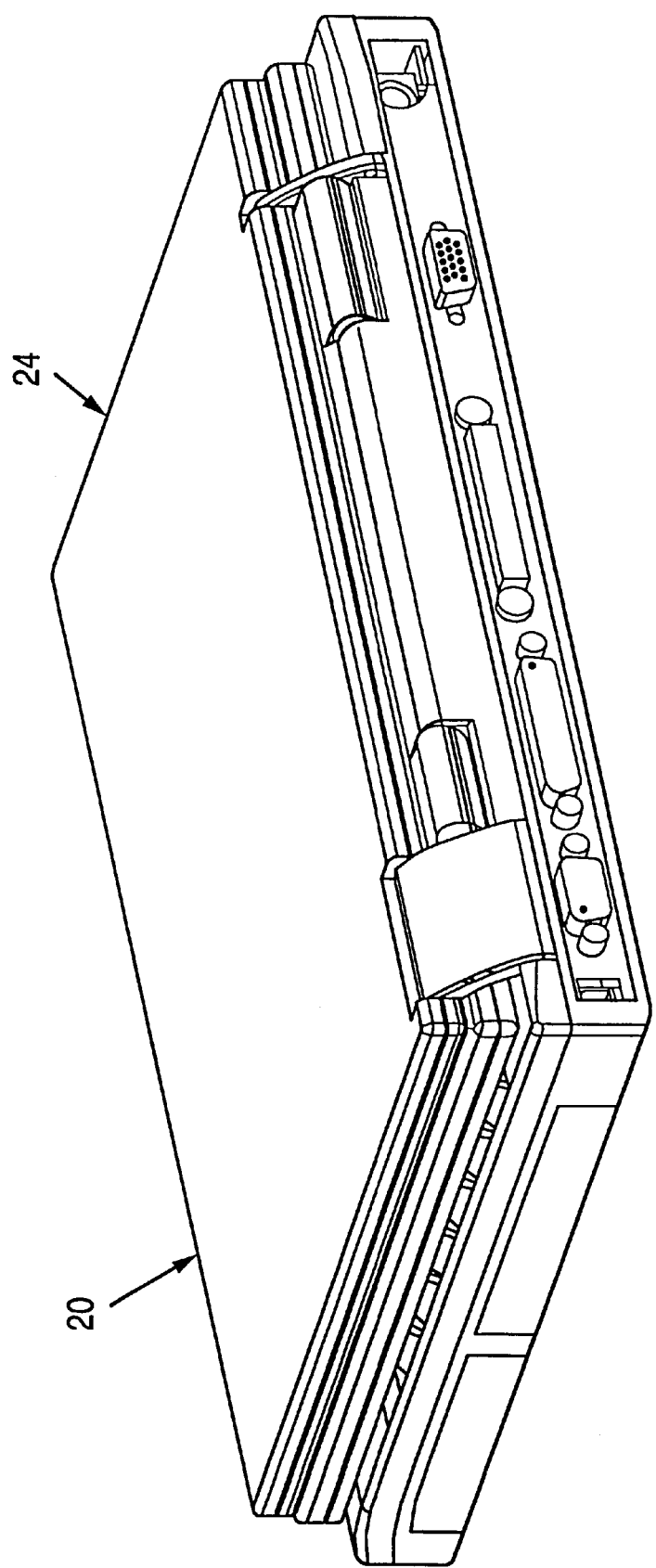
FIG. 11 is a rear perspective view showing the present flat-panel display computer 20 closed.

During normal operation, lid assembly 24 is deployed into the open position as shown in FIG. 1. Because the axes of pusher link 56 and cover link 58 mounted in base assembly 22 are not co-linear with the axes of hinge assembly 38, CPU module sub-assembly 28 is displaced relative to display module sub-assembly 26 when lid assembly 24 is rotated (see FIG. 7). In this way, CPU module sub-assembly 28 separates from display module sub-assembly 26 when lid assembly 24 is opened. Likewise, as shown in FIG. 11, when lid assembly 24 is closed, CPU module sub-assembly 28 and display module sub-assembly 26 are brought together to produce a package size with no gaps between components, thus it is thinner and more easily transportable. Also involved in the opening and closing of lid assembly 24 are module flexures 60a, b, c, and d. These constrain the motion of display module sub-assembly 26 and CPU module sub-assembly 28 to be parallel throughout the range of opening. Module flexures 60a, b, c, and d also allows lid assembly 24 to close with an obstruction between display module sub-assembly 26 and CPU module sub-assembly 28, without damage to the present invention.

When the present invention is turned on, power begins to flow to all the circuit boards and all the components that are being operated. Everywhere power is flowing, heat is being generated and temperatures begin to rise. The majority of the heat in the system is generated among the individual components that comprise main PCB 50 and CPU 52.

Since main PCB 50 and CPU 52 are thermally connected to heat-spreading front cover 46, the majority of the heat generated by main PCB 50 and CPU 52 is transmitted to heat-spreading front cover 46 as opposed to CPU module rear cover 48. This is desirable, as the temperature of a surface, such as the exterior of CPU module rear cover 48, must not exceed a UL touch temperature limit for comfort and safety reasons. Because the gap between display module sub-assembly 26 and CPU module sub-assembly 28 is small enough that heat-spreading front cover 46 is not a user accessible surface, the temperature of heat-spreading front cover 46 can be substantially higher than on a notebook of conventional design, thereby providing for efficient heat exchange cooling as explained below. Heat is transmitted by convection and radiation from heat-spreading front cover 46 to its surroundings. Both of these means of heat transfer are improved by a greater difference of temperature between the material of interest and its surroundings. Therefore, since heat-spreading front cover 46 can be maintained at a higher temperature than exterior surfaces of a flat-panel display computer of conventional design, heat can be transferred away from the present invention more efficiently.

SUMMARY, RAMIFICATIONS, AND SCOPE

As described on the basis of the preferred embodiment, and, in comparison with the conventional art, the flat-panel display computer 20 of the present invention achieves dramatic improvements in function and safety as follows:

(1) More efficient natural or forced convection is available in virtually the same size package.

(2) Because of increased external surface area, as compared with the conventional art, the quantity of heat that can be removed by convection and radiation is greatly increased. Faster more powerful processors may then be used.

(3) Since the heat sensitive components (media bay 64, hard disk drive 62, flat-panel display 30, etc.) are separated from the major heat generating components (main PCB 50 and CPU 52), faster and thus thermally hotter CPU's may be used in the same form factor in the present invention;

(4) Because the present invention cools the internal components better than conventional art, processor speeds may be increased to a point without the inclusion of a forced air system (fan). The fan that would be required in a similarly configured conventional system would be a source of reliability problems, noise, cost, and battery power drain;

(5) Without the inclusion of a fan internal to the system, the external case parts do not have to have air ventilation holes or slots. Without these holes, the electrical components are better protected from environmental hazards such as fluid spills, dust, or electromagnetic interference.

(6) Since much of the generated heat is transferred to a surface that is not accessible to the user before it is conducted to ambient, the external surfaces that the user can contact remain significantly cooler.

(7) Likewise, since the majority of the system heat is conducted to a relatively small area, the heat transfer from that area is more efficient because of the increased surface temperature.

Although the description above contains many specificities, these should not be construed as limiting the scope of the invention, but merely providing illustration of some of the presently preferred embodiments of this invention. The present invention could be made in a variety of configurations. For example, as shown in FIG. 12, CPU module may be completely mechanically removable from the display module. In this case, an extensible heat shield 86 would deploy away from the heat-spreading front cover to allow air to rise up along the spreader, but prohibit any person from touching the heat-spreading front cover. In a related configuration, shown in FIG. 14, the CPU module could be placed in a docking station with with an integral fan 88.

The CPU module need not be connected to the display module with the flexures shown. The CPU module could pivot from a hinge located along one of the side edges of display module, as shown in FIG. 13. In this case, the CPU module would rotate away from the display a few degrees, or it might rotate a full ninety degrees to provide a prop to keep the display open. The user would be protected from touching the hot surface of the CPU module by extensible heat shield 86.

Figure 16:
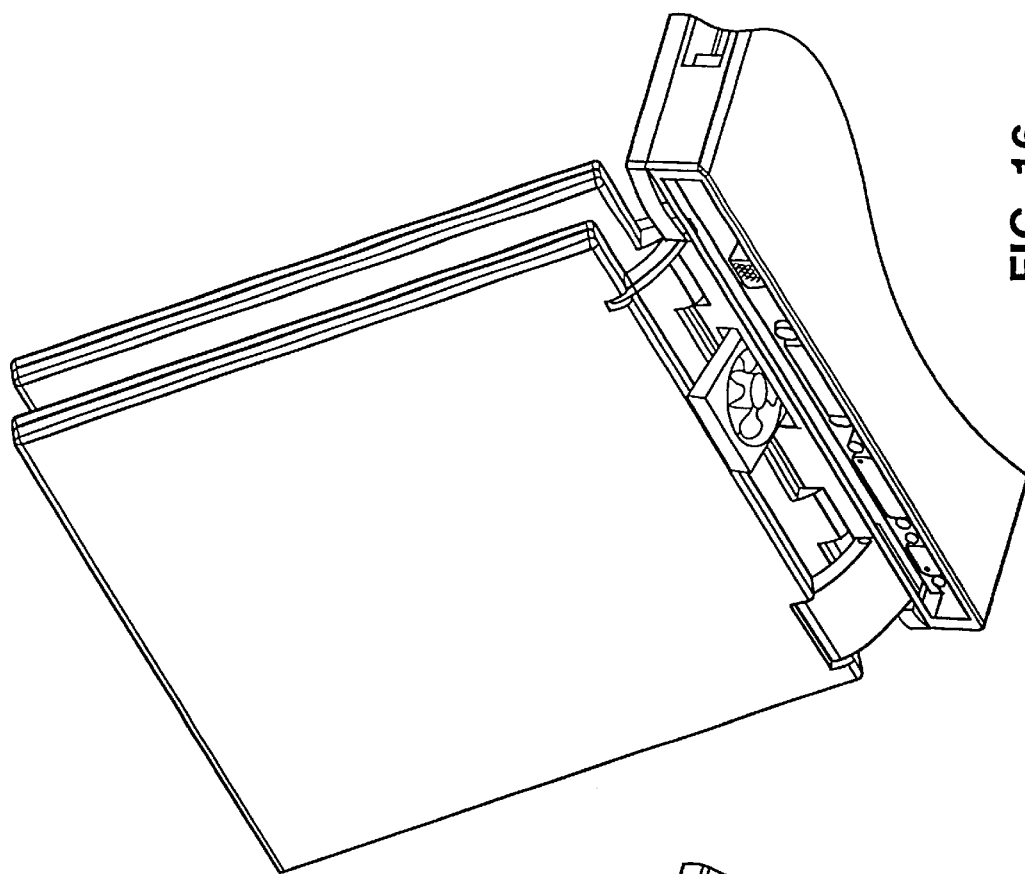
FIG. 16 is a fragmentary view of flat-panel display computer 20 with a fan deployably located at the bottom of lid assembly 24.
Figure 15:
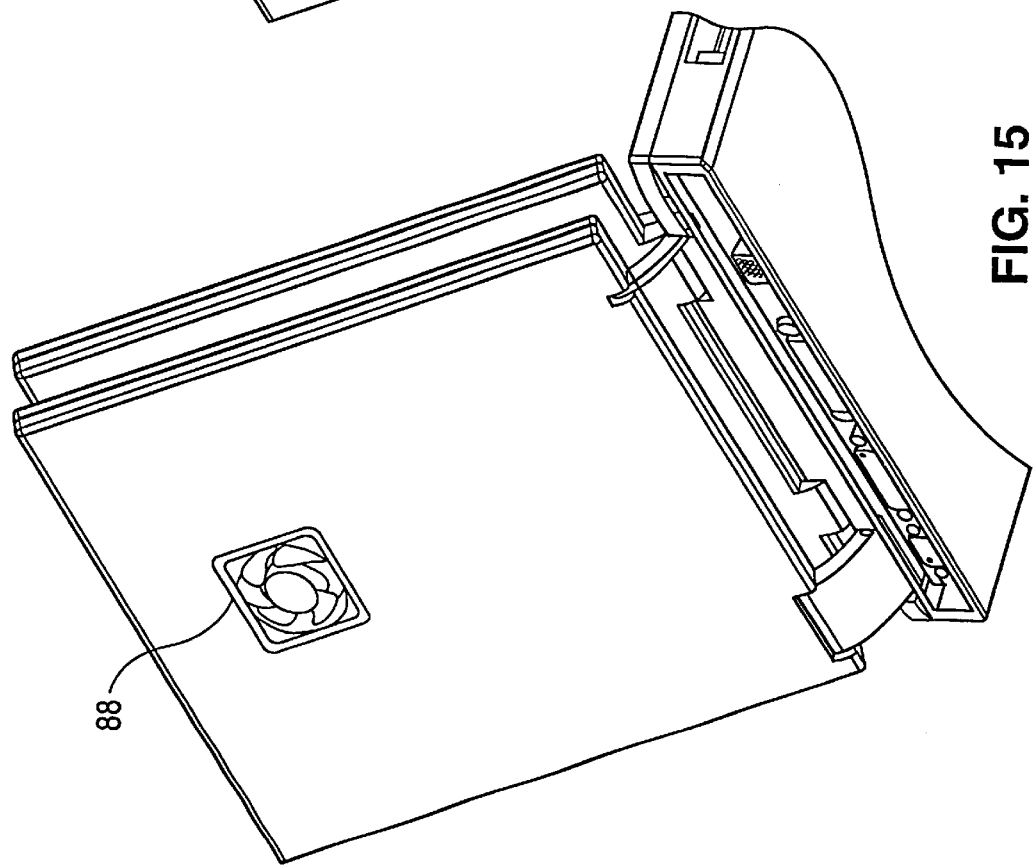
FIG. 15 is a fragmentary rear perspective view of flat-panel display computer 20 with a fan located in CPU module sub-assembly 28.

Referring now to FIG. 15, a fan 88 may be located within the same plane as the CPU module. The fan could deploy or rotate during the opening of the display. As shown in FIG. 16, the fan may also be located within the base, and deploy near the bottom of the CPU module when the computer is opened.

The CPU module could be deployed automatically by a thermal management sub-system that monitors the thermal state of the computer. When the CPU module was determined to be too hot, the module would deploy. The deployment means could be a mechanism that uses a shape-memory alloy that is caused to change shape by being heated by the CPU. An example of this system is shown in FIG. 18, where the links are replaced by a shape-memory alloy element 90. The thermal sub-system measures the temperature inside the computer. When a specified temperature limit is reached, a current is sent through the shape-memory alloy element causing it to straighten, thereby deploying the CPU module away from the display module.

FIG. 19 shows the invention configured with the CPU module rotatably connected to the base. When in use, the CPU module is positioned inclined and spaced away from the rear of the display module, and positioned adjacent to the base when being stored or transported.

The invention could also be useful if configured with a pen-based input device whereby the user would control the device by touching the area over the flat-panel display, as shown in FIG. 17. In this configuration, the media, connectors and other components would be included in the same housing as the flat-panel display. The CPU module would deploy away from the main housing when the unit is in use.

Figure 20:
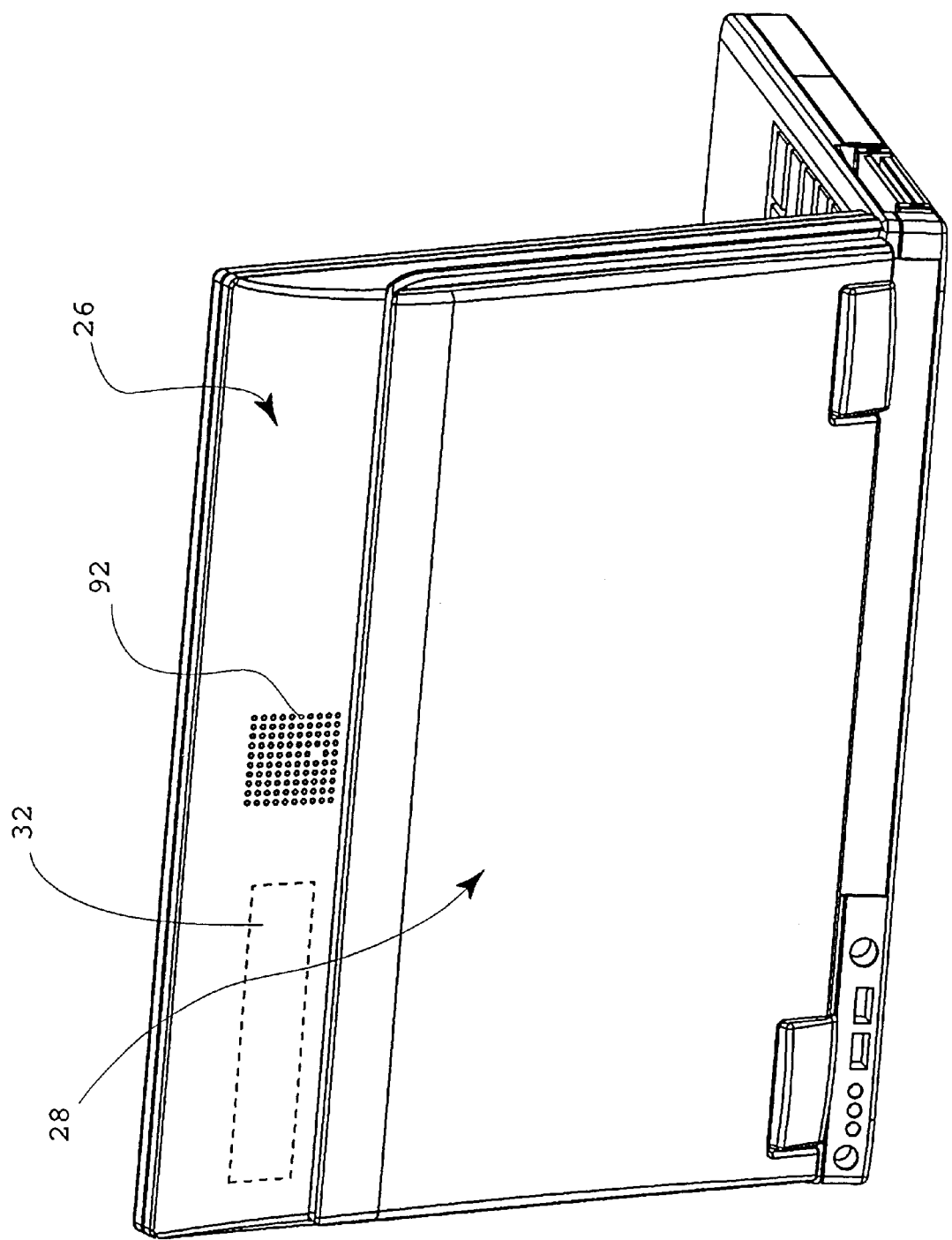
FIG. 20 is a rear perspective view of flat-panel display computer 20 showing a fan vent holes located in the upper portion of the display module.
Figure 21:
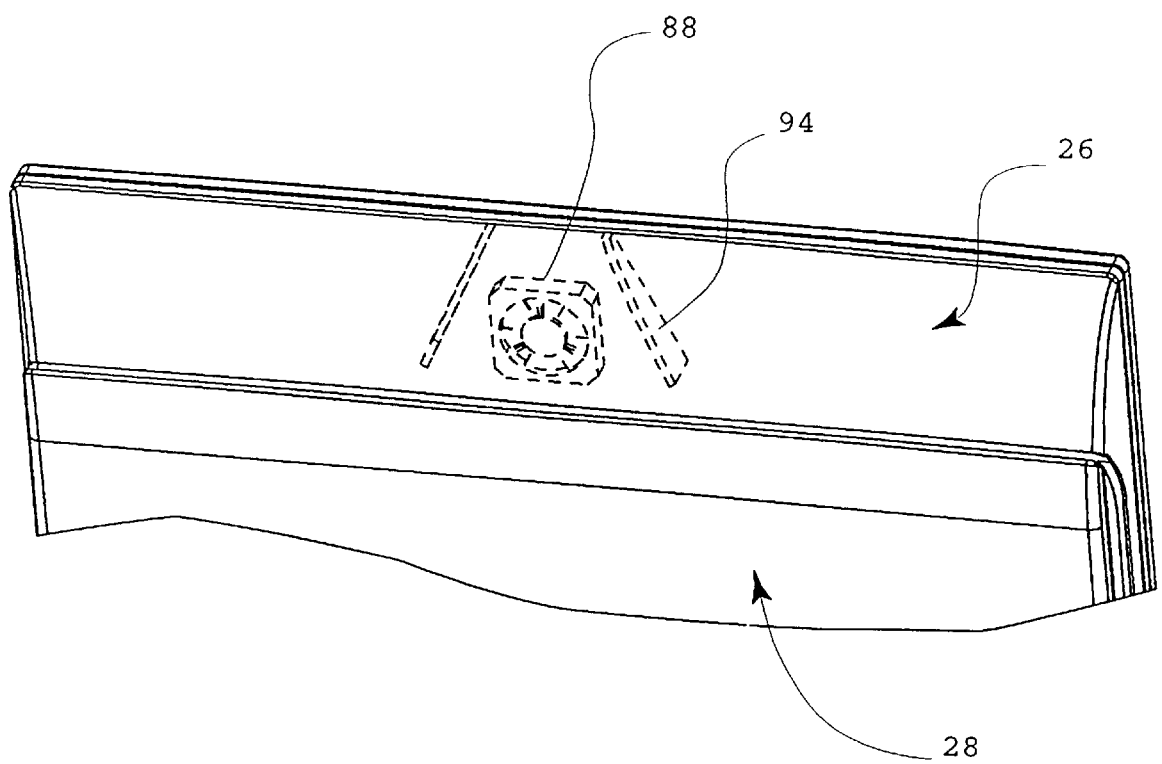
FIG. 21 is a rear fragmentary perspective view of flat-panel display computer 20 showing the location of a fan and ducts.
Figure 22:
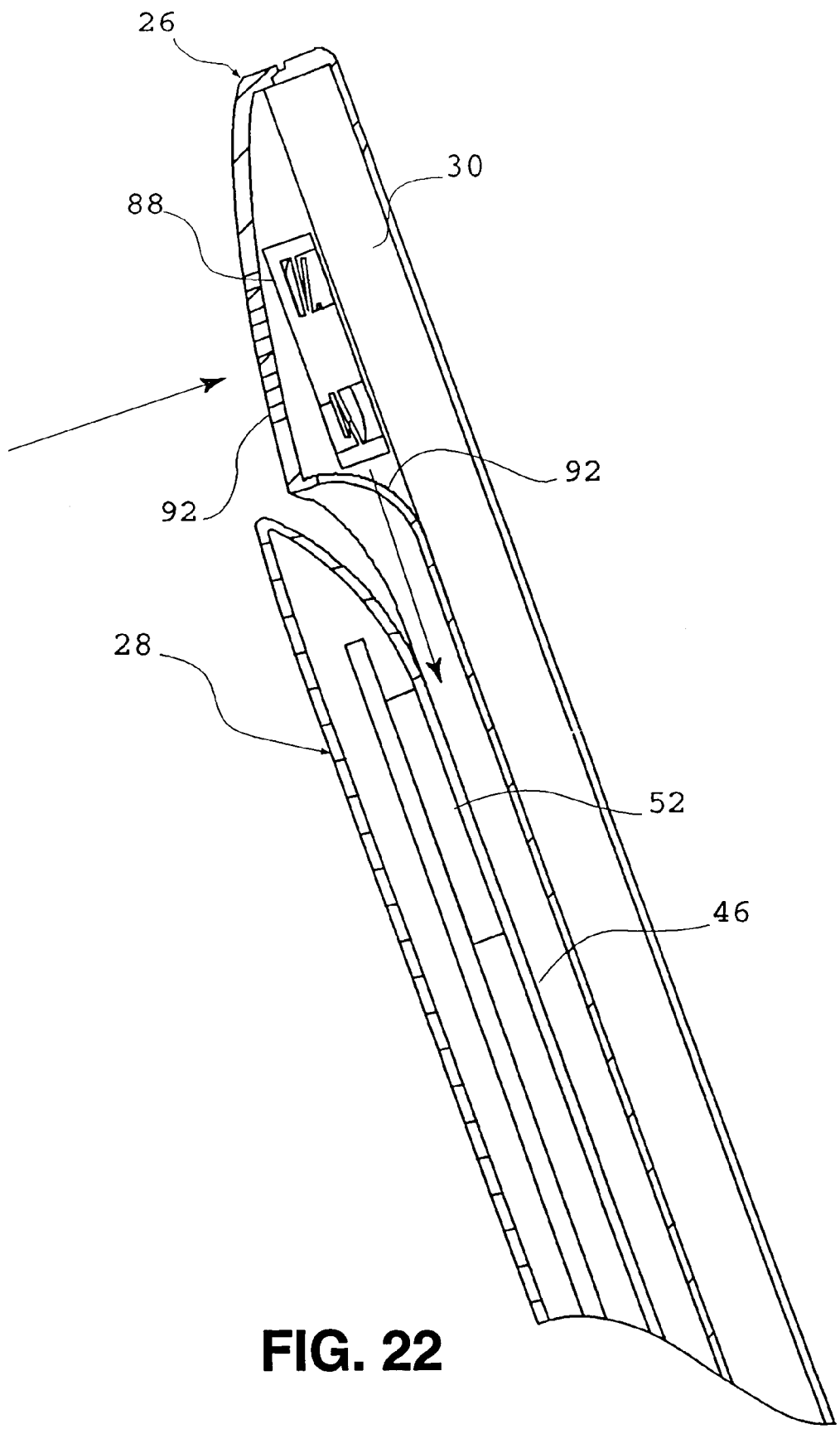
FIG. 22 is a fragmentary cross-section of the display module and CPU module showing the location of a fan in the display module.

FIG. 20 shows a configuration of the present invention whereby fan 88 is located in the upper portion of display module 26, to the rear of flat-panel display 30. Fan 88 is not shown in FIG. 20 but is located behind vent holes 92. Because of the increase in printed circuit board area afforded by the present invention, main PCB 50, and thus CPU module 28, need not extend all the way to the top edge of display module 26. Therefore, as is shown in FIGS. 20, 21, and 22, a section of the upper portion of display module 26 can be extended rearward so that it's outer surface is coincident with the rearward outer surface of CPU module 28, when the computer is closed. Fan 88 can be located in the cavity of the protrusion. As is also shown in FIG. 20, display inverter printed-circuit board 32, which converts DC electrical power to high voltage AC to power the flat-panel display backlight, may also be conveniently housed in this cavity. As is shown, particularly in FIG. 22, when the computer is open and CPU module 28 is translated away from display module 26, the bottom of the cavity is positioned directly above the air-space next to heat-spreading front cover 46 on the forward side of CPU module 28. Fan 88 shown in FIGS. 21 and 22 is a centrifugal fan, which takes air in from the airspace to the rear of fan 88's location in the protrusion in display module 26, and expels it downward into the space between CPU module 28 and display module 26. The arrows in FIG. 22 show the direction of airflow. With the external vent holes 92 removed for clarity, FIG. 21 shows fan 88 and the ducts 94 in the plastic cavity of display module 26. Ducts 94 could be used to direct and concentrate the flow of air toward a hot-spot where CPU 52 is attached to heat-spreading front cover 46, as depicted in FIG. 22. Concentrating the cool airflow directly on this hot spot will increase the amount of heat that is removed from CPU module 28.

Figure 23:
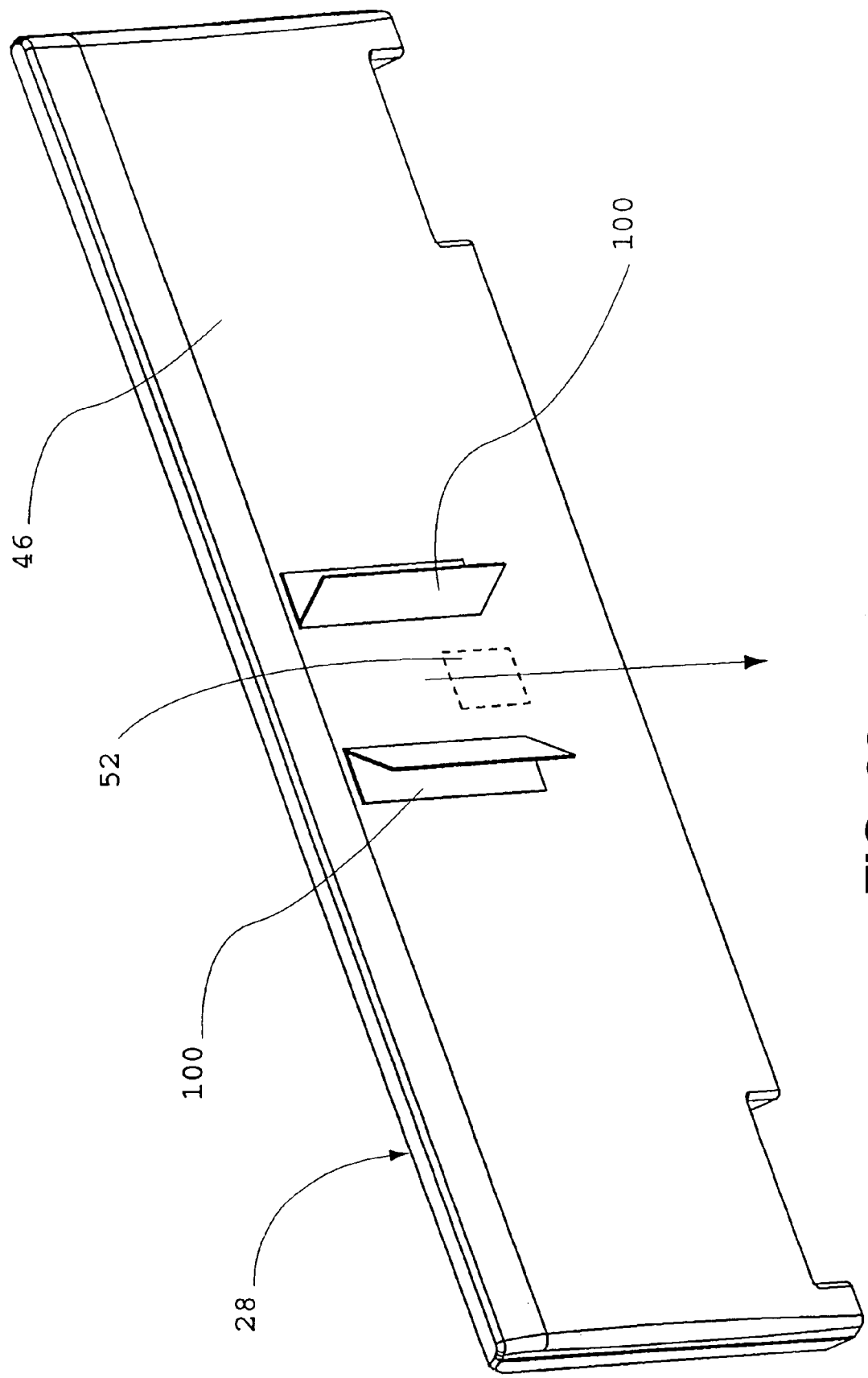
FIG. 23 is a perspective view of the front side of the CPU module.

Further concentration of the airflow from fan 88 could be achieved by including a collapsible channel 100 fabricated out of thin film plastic pieces that are attached to heat-spreading front cover 46 with adhesive, as shown in FIG. 23, a top perspective view of CPU module 28. The other components of the system are not shown so as not to obscure the present subject of the invention. The arrow in FIG. 23 shows the direction of airflow and CPU 52 is shown with dashed lines. When CPU module 28 is closed against display module 26, the walls of collapsible channel 100 fold down against the heat-spreading front cover. When display module 26 is opened and CPU module 28 translates away from display module 26, the walls of collapsible channel 100 spring up to create an air channel which concentrates airflow on hot spot at CPU 52, thereby increasing heat transfer.

Figure 24:
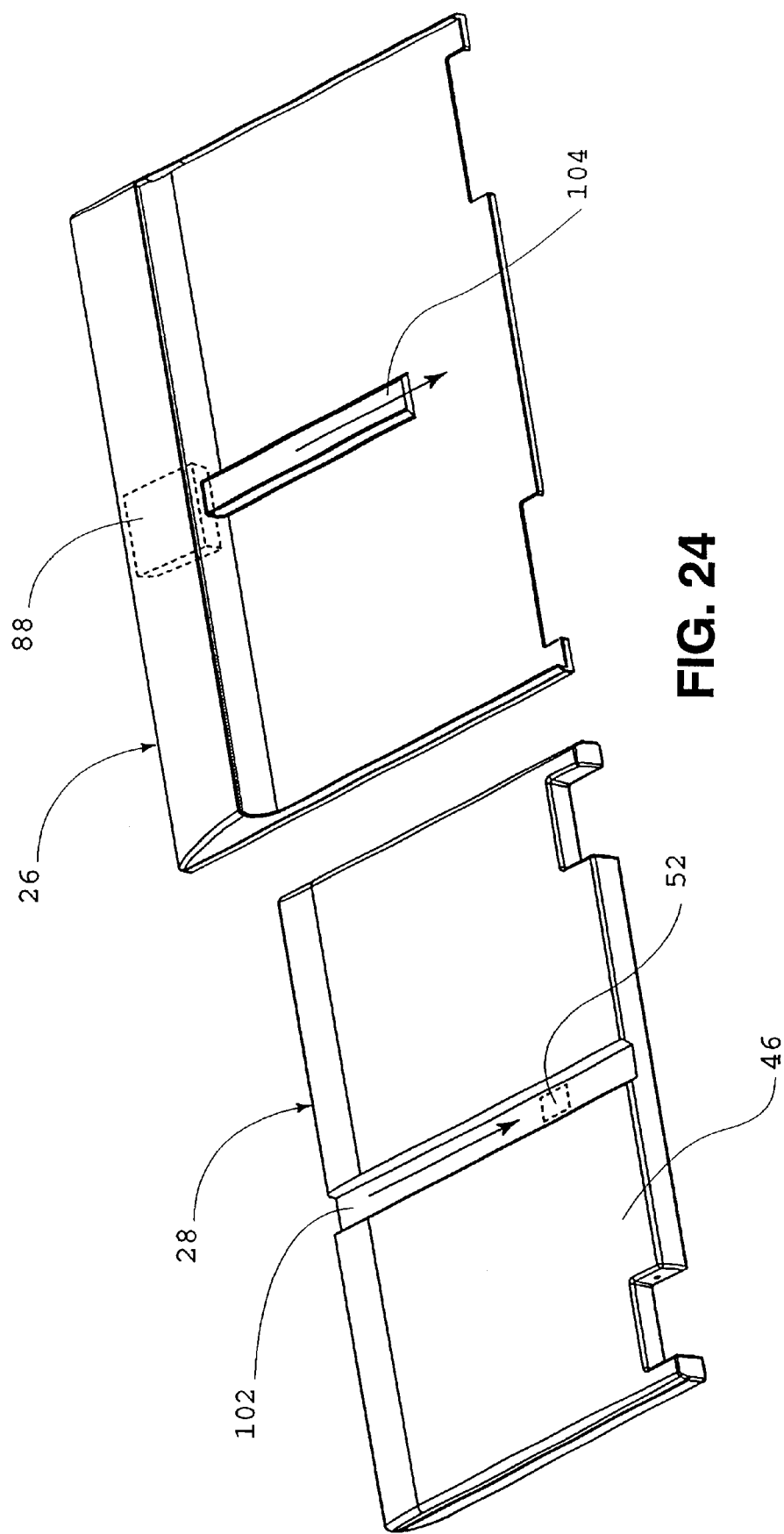
FIG. 24 is a perspective view of the CPU and display modules.

Two other embodiments that achieve concentrated airflow on the hot part of heat-spreading front cover 46 are shown in FIG. 24, in which CPU module 28 and display module 26 have been separated and placed side by side for clarity. In one embodiment, an indented channel 102 is created in heat-spreading front cover 46. Air would be blown down indented channel 102 by fan 88 located in the rearward protrusion of display module 26. Indented channel 102 is possible because CPU 52 is substantially shorter than the overall dimension of CPU module 28, so heat-spreading front cover 46 can be indented directly above CPU 52. No other tall electrical components can be placed in the path of the indented channel 102. An arrow shows the direction of airflow. Since this path is the largest and least restrictive, airflow from fan 88 is concentrated in indented channel 102, thereby removing a substantial amount of heat from the spot where CPU 52 is thermally attached to heat-spreading front cover 46. This design allows some air to flow laterally out of indented channel 102 to convectively cool the non-indented areas of heat-spreading front cover 46.

A different embodiment of this design, as shown in FIG. 24, includes indented channel 102 in heat-spreading front cover 46 on CPU module 28 mentioned above, but also includes an enclosed integral nested duct 104 on the rearward surface of display module 26. This design simultaneously allows natural convection of air upward along the non-indented planar portions of heat-spreading front cover 46, along with concentrated forced convection of air directed toward the hot spot where CPU 52 is thermally connected to heat-spreading front cover 46. Protruding nested duct 104 on display module 26 would nest inside indented channel 102 in heat-spreading front cover 46 when CPU module 28 is closed against display module 26, so there is no resultant increase in height of the portable with this design.

These embodiments show how fan 88 may be included in the present invention with minimal impact to the overall form factor of the design, but still provide substantial forced convection of heat away from heat-spreading front cover 46 of CPU module 28.

Since airflow around CPU module 28 is a key aspect of the design presented herein, one could design zinc-air batteries into CPU module 28. These batteries generate electricity utilizing high performance gas electrodes with a porous Teflon/catalyst membrane. Air must be continually moved across the membrane for the battery to generate electricity. The upward movement of the cooling air could simultaneously provide air to the battery electrodes.

Another embodiment of the present invention might include heat-spreading front cover 46 manufactured out of a material that has a substantially large coefficient of thermal conductivity. For example, heat-spreading front cover 46 on CPU module 28 might be constructed out of carbon-fiber sheet material instead of aluminum. Carbon fiber mat has many times the heat conducting capability of aluminum. Heat-spreading front cover 46 might also be fabricated out of a combination of thermally conductive materials, such as combining aluminum and carbon fiber sheets.

Figure 25:
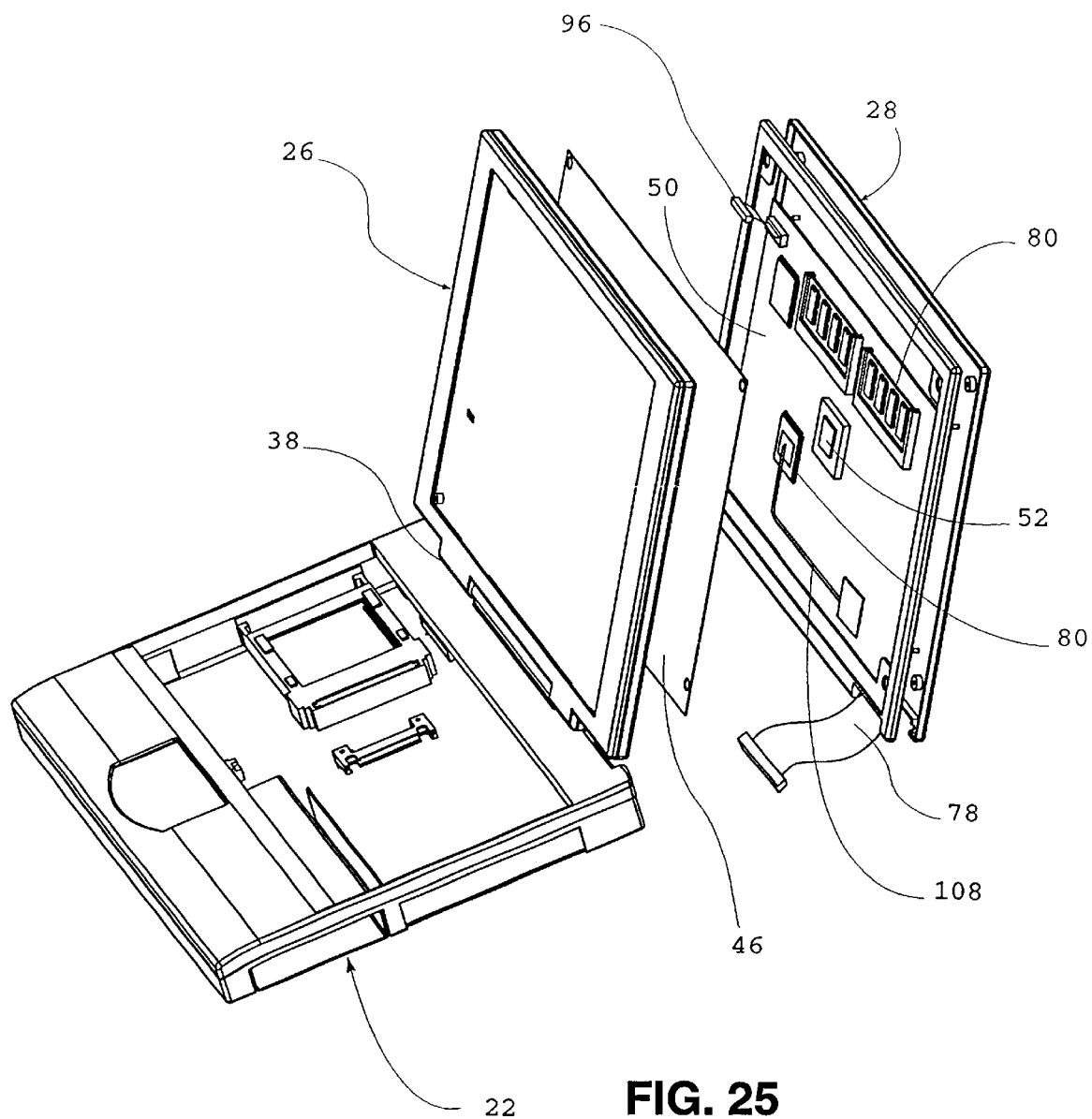
FIG. 25 is an exploded perspective view of the flat-panel display computer.

Due to the efficient thermal dissipation capability of the design presented herein, it would be prudent to include as many hot components and subsystems as possible in CPU module 28. The battery charging circuitry, which is the source of significant heat could be designed into this module. Additionally, the video controller subsystem could be included in CPU module 28. As shown in FIG. 25, this design allows for a much shorter flat-panel display flexible circuit 96 than is possible in a conventional design. Rather than extending from base 22 up to flat-panel display 30 through hinge assembly 38, the flat-panel display flexible circuit only has to traverse the small gap between CPU module 28 and display module 26. This shorter dimension for flat-panel display flexible circuit 96 would result in a lower part cost and will make flat-panel display flexible circuit 96 easier to assemble and to shield for EMI.

Figure 26:
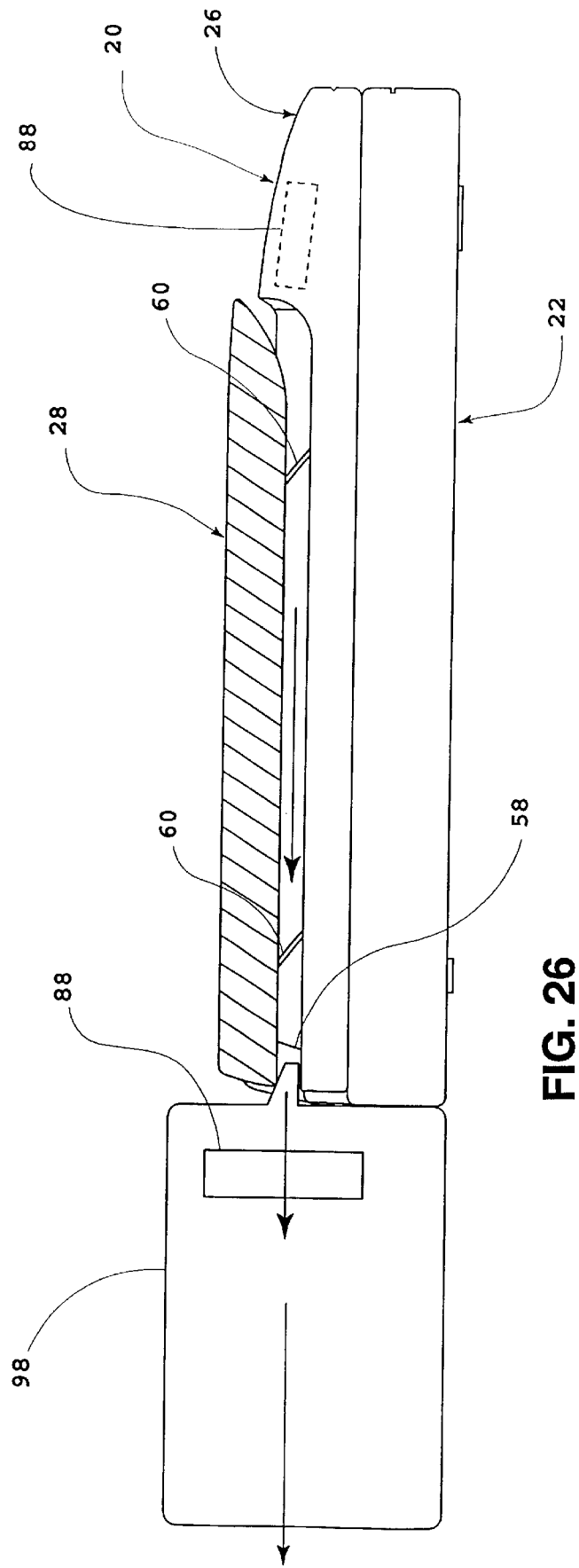
FIG. 26 is a side view showing the CPU module translated away from the flat-panel display module while the portable is docked.

In certain docked situations, display module 26 is left closed and an external monitor is used. In the closed configuration, the design could include small air gaps between the modules that would further increase the temperature differential between modules. For example, when the portable is connected to portable computer dock 98 and running with display module 26 closed against base 22, a 1 mm fixed gap between CPU module 28 and display module 26 would result in a substantial temperature drop between the two modules, thereby providing a safe temperature for flat-panel display 30. If fan 88 is incorporated into the upper portion of display module 28, as mentioned previously, fan 88 could be turned on when the portable is connected to portable computer dock 98 and display module 26 is closed. The 1 mm gap will allow a certain amount of airflow that will further reduce the temperature of flat-panel display 30. Furthermore, in a docked situation as shown in FIG. 26, the design could include a means for separating CPU module 28 from display module 26 while display module 26 closed against base 22. The components and assemblies in FIG. 26 are shown somewhat diagrammatically so that the detail does not obscure the present invention. This gap creates a substantial temperature drop between heat-spreading front cover 46 of CPU module 28 and flat-panel display 30. Fan 88 could be added to portable computer dock 98, again as shown in FIG. 26, to provide forced convection of air, as shown by the arrows, between CPU module 28 and display module 26, thereby cooling both modules.

Figure 27:
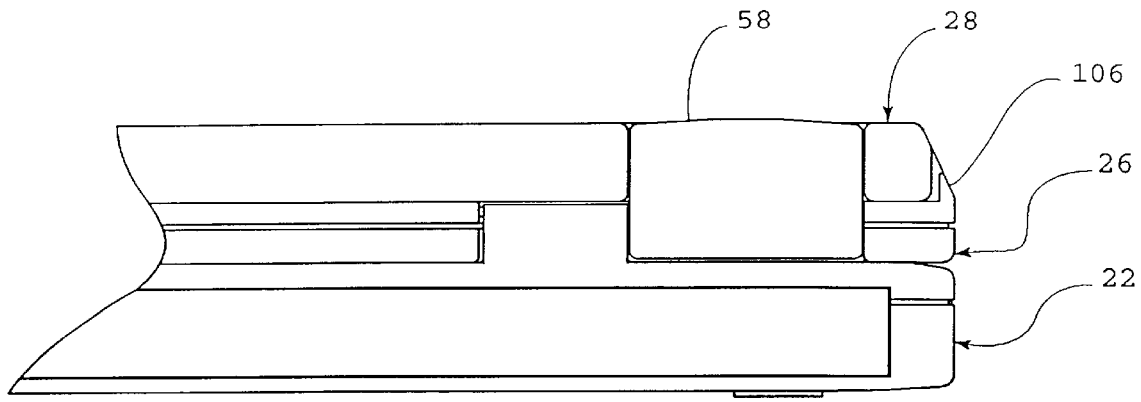
FIG. 27 is a rear fragmentary view of the present flat-panel computer showing the return of the flat-panel display module while the computer is closed.
Figure 28:
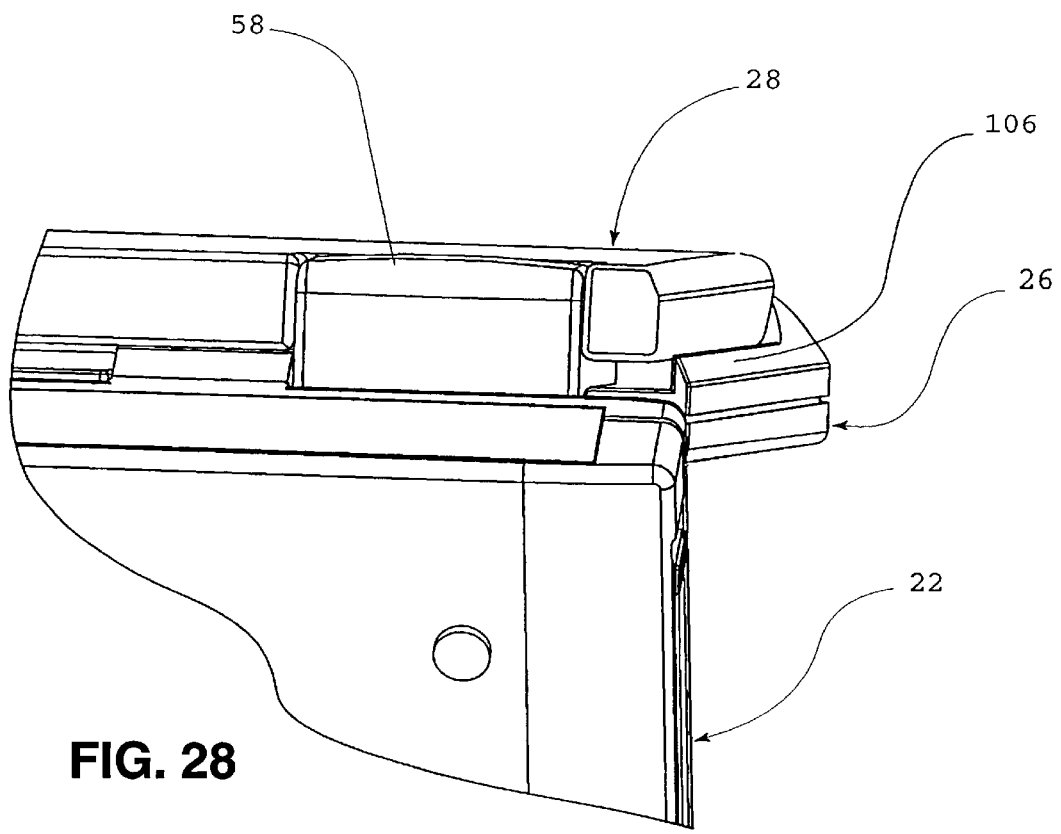
FIG. 28 is a rear fragmentary perspective view of the flat-panel display computer 20, viewed along the right edge of the CPU Module, with the computer open.

As is depicted in FIGS. 27 and 28, the sides of display module 26 could include a right-angled plastic gap covering wall 106 to obscure the gap between CPU module 28 and display module 26 when the portable is open. FIG. 27 is a rear view showing the computer closed with CPU module 28 nested inside display module 26. FIG. 28 shows that when CPU module 28 is translated open during use, the gap is not accessible from the side because of the upward return of the edge of gap covering wall 106 on display module 26. This prevents objects from being caught in the gap when the portable is closed. Since airflow occurs mainly in the vertical direction, closing off the sides in this manner will not significantly effect the cooling ability of the design. The barrier could also be designed by extending a wall from the CPU module to cover the gap.

Heat-spreading front cover 46, which may also be an integral EMI shield, might have flexible, springable tines that maintain contact with display module 26 through-out the range of translation of CPU module 28. In addition to providing many ground points to ground CPU module 28 to display module 26, these springable tines could be designed so that they act as the spring force to drive CPU module 28 away from display module 26 when display module 26 is open.

The motherboard, or main PCB 50 in CPU module 28 could be integral with heat-spreading front cover 46. The printed-circuit board material could be laminated directly to an aluminum plate, which is integral to or connected to, heat-spreading front cover 46.

A Heatpipe 108 or other heat-moving devices could be used inside CPU module 28 to move heat to cooler parts of heat-spreading front cover 46. For example, as shown in FIG. 25, there will be a hot spot where heat-spreading front cover 46 contacts CPU 52. The temperature of the spreader material, and thus heat-transfer to the air, will decrease with distance from this hot spot. For electrical layout reasons, a hot support IC 80 may have to be located near CPU 52. Heat from support IC 80 may be efficiently moved to a remote spot on heat-spreading front cover 46 that is a substantial distance from the hot spot created by CPU 52, by connecting hot support IC 80 to this remote portion of heat-spreading front cover 46 with heatpipe 108. The remote end of heatpipe 108 would be thermally connected to heat-spreading front cover 46.

Figure 29:
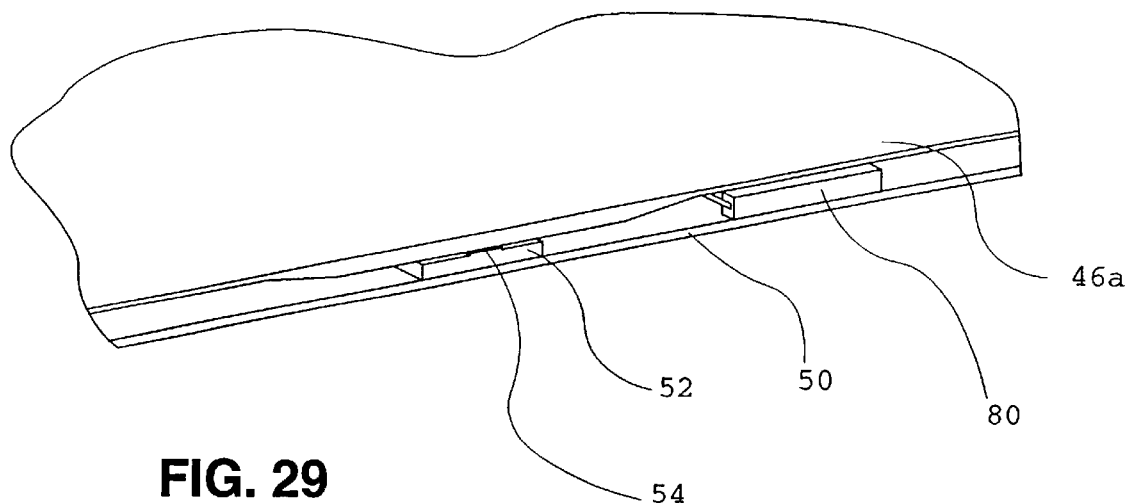
FIG. 29 is a cross-section view of the heat-spreading front cover showing varying wall thickness.

Another method of increasing the heat spreading effectiveness of heat-spreading front cover 46 is to vary its wall thickness. Heat conducting capability increases with the cross-sectional area of the conducting material. At the same time the overall thickness of the portable must be kept to a minimum. Therefore, as is shown in FIG. 29, heat-spreading front cover 46a may be designed with a minimum wall thickness over the taller components, and an increased wall thickness over shorter components. FIG. 29 shows a portable wherein CPU 52 is one of the hotter components and is shorter than a nearby DRAM connector 80. Heat-spreading front cover 46a is thicker where it contacts the top of CPU 52, and becomes thinner where it covers the taller DRAM connector 80. The thicker areas of heat-spreading front cover 46a will more effectively move heat away from CPU 52.

Figure 30:
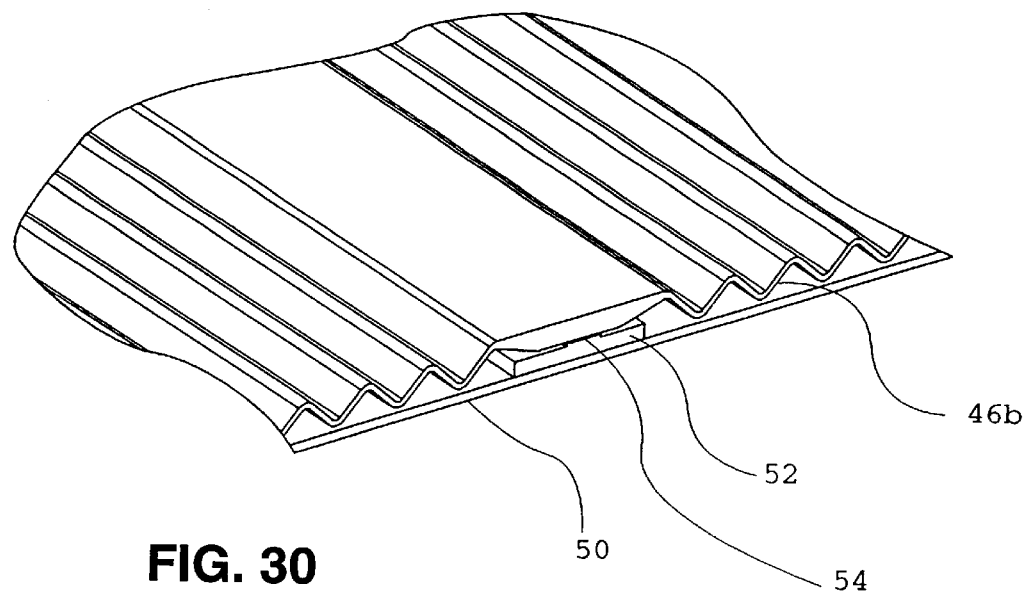
FIG. 30 is a cross-section perspective view of a corrugated heat-spreading front cover.

Yet another method for increasing the cooling efficiency is to increase the surface area of heat-spreading front cover 46 by introducing corrugations in the cover in the areas between components on main PCB 50. FIG. 30 shows a cross-section of heat-spreading front cover 46b with corrugations where there is space between components. Note that neither heat-spreading front cover 46a with varying thickness, nor heat-spreading front cover 46b with corrugations, increases the thickness of CPU module 28, rather, they extend down into the empty volume of CPU module 28 where there are shorter components or no components.

Figure 31:
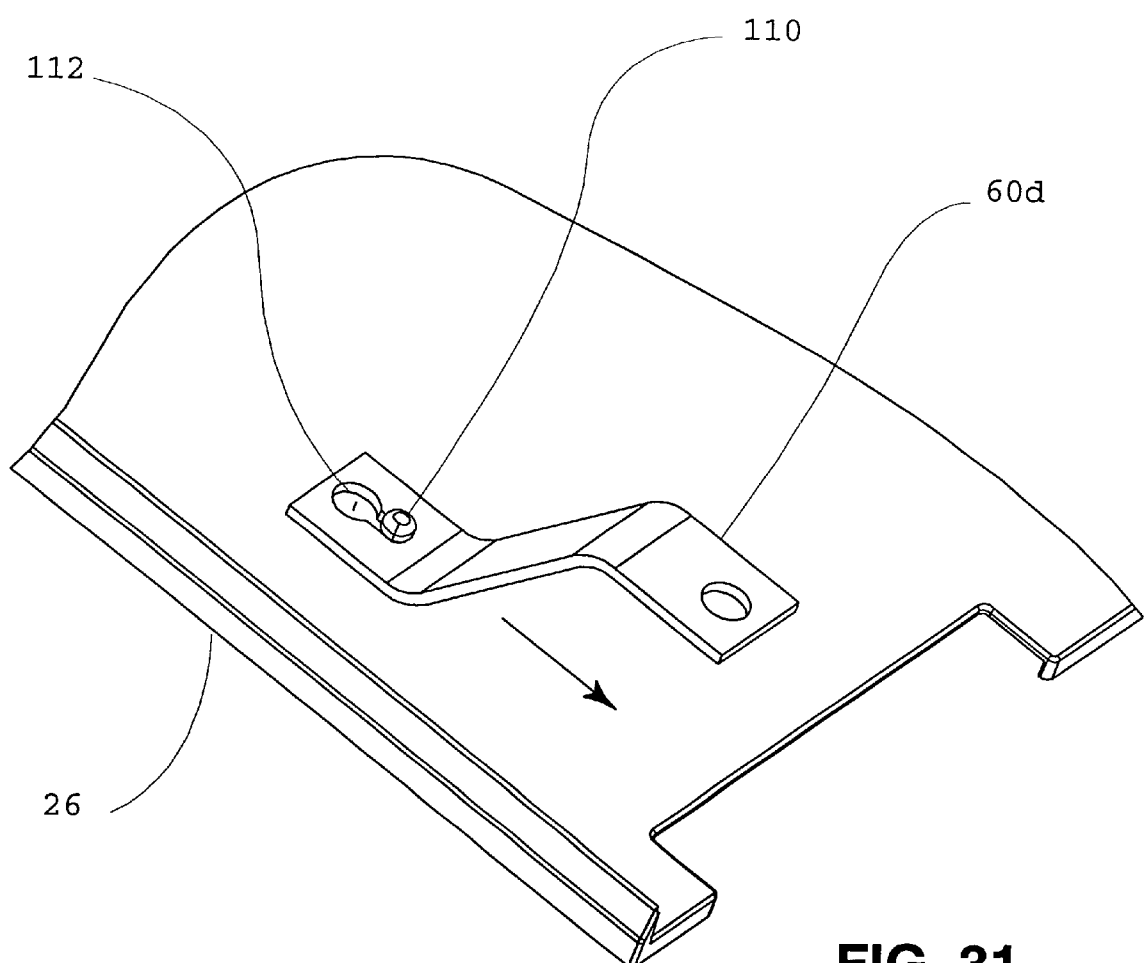
FIG. 31 is a fragmentary perspective view of display module 26 and module flexure 60d with other components removed for clarity.

Another benefit of the vertical translating CPU module design is that CPU 52 and other commonly upgradable components, such as DRAM, are more easily accessed than in a conventional design where these components are buried in the base. Module flexures 60, as shown in FIGS. 5, 6, 7, and 8, might include a reversible detachment feature, as shown in FIG. 31, so that CPU module 28 may be removed from the back of display module 26. Module flexure 60 contains a slotted hole 112 in the top end that is constrained by a lug 110 protruding from display module 26. In normal operation, module flexures 60 are constrained so that lug 110 is forced against the narrow bottom part of flexure slotted hole 112. Module flexures 60 are removed by opening display module 26 so that CPU module 28 is translated, and pushing the top part of module flexures 60 down, in the direction of the arrow in FIG. 31, so that lug 110 aligns with the larger hole in flexure slotted hole 112. Module flexures 60 can then be removed from display module 26. Two flexible printed circuits, base flexible circuit 78 and flat-panel display flexible circuit 96, as shown in FIG. 25, would be unplugged. CPU module 28 would also be removed from pusher link 56 and cover link 58 by removing the pivots. CPU 52 and support ICs 80 such as DRAM, that are located on Main PCB 50, would then be easily accessed by removing heat-spreading front cover 46. This relationship is depicted in FIG. 25. Heat-spreading front cover 46 may be detached by removing the four screws located in the corners of CPU module 28, which are shown in FIG. 5 but not numbered. The design of detachable module flexures 60 and detachable heat-spreading front cover 46 could be implemented in a variety of ways that would be obvious to those skilled in the art of portable computer design. Once heat-spreading front cover 46 is removed, new components could be added and the components would be reassembled.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A portable computer comprising in combination
a display module containing a flat-panel display
a closed CPU module containing at least one heat producing component associated with a portable computer and located between a heat-spreading front cover element facing said display module and a rear panel;
means for connecting said display module, said CPU module and said base in a substantially closed planar module when the computer is closed and for moving said display module with respect to said base for viewing when the computer is open;
means for positioning said CPU module adjacent to said display module when the computer is closed, and positioning said CPU module heat-spreading front cover substantially parallel to and spaced away from said display when the computer is being used with the space between said display module and said CPU module beat-spreading front cover limited to prevent contact by the user with said heat-spreading front cover.

2. The computer of claim 1 including an air moving means included in said CPU module.

3. The computer of claim 1 including an air moving means located in said base.

4. The computer of claim 1 including an air moving means located in the plane of the CPU module.

5. The computer of claim 1 wherein a thermally conductive material resides between said at least one heat producing component and said heat-spreading front cover.

6. The computer of claim 1 wherein the heat-spreading front cover is an integral EMI shield.

7. The computer of claim 1 including an air moving means located in said display module.

8. The computer of claim 1 including zinc air batteries located in the CPU module.

9. The computer of claim 1 wherein the heat-spreading front cover contains at least a portion made of carbon-fiber.

10. The computer of claim 1 including a minute fixed gap between said CPU module and sad display module when said display module is closed against said base.

11. The computer of claim 1 including rearward protruding side edges of said display module such that the dimension of the protrusion is a larger dimension than the largest dimension of the gap created between said CPU module and said display module.

12. The computer of claim 1 including a heatpipe in said CPU module.

13. The computer of claim 1 wherein said heat-spreading front cover varies in thickness.

14. The computer of claim 1 wherein said heat-spreading front cover includes corrugations.

15. The computer of claim 1 including means for detaching said CPU module from said display module for purposes of maintenance or upgrade.

16. A portable computer comprising in combination
a display module containing a flat-panel display;
a base, containing a plurality of components associated with a portable computer;
a closed CPU module containing at least one heat producing component associated with a portable computer and located between a heat-spreading front cover element facing said display module and a rear panel;
means for connecting said display module, said CPU module and said base in a substantially closed planar module when the computer is closed and for moving said display module with respect to said base for viewing when the computer is open;
means for positioning said CPU module adjacent to said display module when the computer is closed, and positioning said CPU module heat-spreading front cover substantially parallel to and spaced away from said display module when the computer is being used with the space between said display module and said CPU module heat-spreading front cover limited to prevent contact by the user with said heat-spreading front cover;
an airflow channeling means located between said CPU module and said display module for directing forced air toward a specific area of the heat-spreading front cover; and
an air moving means in a location selected from the group consisting of said base, said CPU module, and said display module.

17. The computer of claim 16 wherein said airflow channeling means is collapsible.

18. A portable computer system comprising in combination
a portable computer comprising
a display module containing a flat-panel display;
a base containing a plurality of components associated with a portable computer;
a closed CPU module containing at least one heat producing component associated with a portable computer and located between a heat-spreading front cover element facing said display module and a rear panel;
means for connecting said display module, said CPU module and said base in a substantially closed planar module when the computer is closed and for moving said display module with respect to said base for viewing when the computer is open;
means for positioning said CPU module adjacent to said display module when the computer is closed, and positioning said CPU module heat-spreading front cover substantially parallel to and spaced away from said display module when the computer is being used with the space between said display module and said CPU module heat-spreading front cover limited to prevent contact by the user with said heat-spreading front cover;
a dock comprising a plurality of connectors, including a connector for electrically connecting said dock to said portable computer, and a means for translating said CPU module away from said display module while said portable is connected to said dock and while said display module is closed against said base.

19. The computer system of claim 18 including an air moving means in said dock.

20. A portable computer comprising in combination
a display module containing a flat-panel display and a rearward protruding cavity for containing components associated with a portable computer, whose rearward dimension is substantially the same as the dimension of the rearward dimension of a CPU module when said CPU module is closed against said display module;
a base containing a plurality of components associated with a portable computer;
a closed CPU module with at least one of the length or width dimensions smaller than the corresponding dimension of said display module by an amount equal to or less than the dimension of said display module rearward protruding cavity, and containing at least one heat producing component associated with a portable computer, a heat-spreading front cover element facing said display module and a rear panel; and with said one heat producing component located between said heat spreading front cover element and said rear panel means for connecting said display module, said CPU module and said base in a substantially closed planar module when the computer is closed and for moving said display module with respect to said base for viewing when the computer is open;

means for positioning said CPU module adjacent to said display module when the computer is closed, and positioning said CPU module heat-spreading front cover substantially parallel to and spaced away from said display module when the computer is being used with the space between said display module and said CPU module heat-spreading front cover limited to prevent contact by the user with said heat-spreading front cover.

21. The computer of claim 20 including an air moving means located in said display module rearward protruding cavity for moving air into said space between said display module and said CPU module.

22. The computer of claim 20 including an air moving means located in said display module.

23. The computer of claim 20 including a printed circuit board located in said display module to the rear of said flat-panel display.

24. The computer of claim 20 including an air moving means located in said base.

25. The computer of claim 20 including zinc air batteries located in the display module.

26. The computer of claim 20 including rearward protruding side edges of said display module such that the dimension of the protrusion is a larger dimension than the largest dimension of a gap created between said CPU module and said display module.

27. The computer of claim 20 including means for detaching said CPU module from said display module for purposes of maintenance or upgrade.

28. The computer of claim 20 wherein a thermally conductive material resides between said at least one heat producing component and said heat-spreading front cover.

29. The computer of claim 20 wherein the heat-spreading front cover contains at least a portion made of carbon fiber.

30. The computer of claim 20 including a minute fixed gap between said CPU module and said display module when said display module is closed against said base.

31. The computer of claim 20 including rearward protruding said edges of said display module such that the dimension of the protrusion is a larger dimension than the largest dimension of the gap created between said CPU module and said display module.

32. The computer of claim 20 including a heat pipe in said CPU module.

33. The computer of claim 20 wherein said heat-spreading front cover varies in thickness.

34. The computer of claim 20 wherein said heat spreading front cover includes corrugations.

35. The computer of claim 20 including collapsible air channel forming members in said space between said display module and said CPU module.

36. The computer of claim 21 including means defining at least one air duct for conducting air from said air moving means and said at least one heat producing component.

* * * * *